United States Patent
Liguori

[11] Patent Number: 5,912,672
[45] Date of Patent: Jun. 15, 1999

[54] OBJECT BASED RENDERING SYSTEM FOR THE RENDERING OF IMAGES USING EDGE BASED OBJECT DESCRIPTIONS AND SETABLE LEVEL INDICATORS

[75] Inventor: Vincenzo Liguori, New South Wales, Australia

[73] Assignees: Canon Kabushiki Kaisha, Tokyo, Japan; Canon Information Systems Research Australia Pty Ltd, New South Wales, Australia

[21] Appl. No.: 08/516,068

[22] Filed: Aug. 17, 1995

[30] Foreign Application Priority Data

Sep. 16, 1994 [AU] Australia .................................. PM8223

[51] Int. Cl.⁶ ...................................................... G06T 9/00
[52] U.S. Cl. ............................................. 345/433; 345/421
[58] Field of Search .................................... 395/115, 116, 395/121, 122, 133, 134, 135, 788; 345/113, 114, 115, 120, 421, 422, 433, 434, 435

[56] References Cited

U.S. PATENT DOCUMENTS

| | | | |
|---|---|---|---|
| 5,265,198 | 11/1993 | Gonzalez-Lopez et al. | 395/122 |
| 5,363,475 | 11/1994 | Baker et al. | 395/122 |
| 5,509,110 | 4/1996 | Latham | 395/121 |
| 5,544,290 | 8/1996 | Gentile | 395/115 |
| 5,555,358 | 9/1996 | Blumer et al. | 395/141 |
| 5,583,974 | 12/1996 | Winner et al. | 395/122 |
| 5,600,768 | 2/1997 | Andresen | 395/135 |
| 5,604,847 | 2/1997 | Dennis et al. | 395/116 |
| 5,608,848 | 3/1997 | Walker | 395/116 |
| 5,611,024 | 3/1997 | Campbell et al. | 395/114 |
| 5,613,050 | 3/1997 | Hochmuth et al. | 395/122 |

FOREIGN PATENT DOCUMENTS

| | | |
|---|---|---|
| 0167166 | 1/1986 | European Pat. Off. . |
| 0459350 | 12/1991 | European Pat. Off. . |
| 0465250 | 1/1992 | European Pat. Off. . |
| 0475601 | 3/1992 | European Pat. Off. . |
| 0575134 | 12/1993 | European Pat. Off. . |
| 0578256 | 1/1994 | European Pat. Off. . |

OTHER PUBLICATIONS

Eurographics '91 Tutorial Note 11, vol. eg91. No. tn11, 1991, pp. 1–23, XP002010647, Hersch: "Digital Typography and Raster Imaging: The Desktop of the 90's", p. 2, paragraph 2 —p. 5, line 3.

*Primary Examiner*—Stephen S. Hong
*Attorney, Agent, or Firm*—Fitzpatrick, Cella, Harper & Scinto

[57] ABSTRACT

A graphical object rendering system for the rendering of images from edge based object descriptions, into pixel based data, is disclosed. The system includes a buffer that comprises an array of storage structures to hold pixel level data, with each pixel level data structure further comprising a series of setable level indicators. A separate storage arrangement is provided for storing an edged based object description of the desired image, each edge of each object having a level value corresponding to the level of the object. An edge insertion means is connected to the buffer and the storage arrangement, to alter the setable level indicators at locations corresponding to any intersection of the edges with the pixels. A highest object determinator is configured to determine the object with the highest currently active level, the highest object determinator being connected to the buffer and, for each corresponding pixel level data structure of the array of pixel level data structures, it determines the object with the highest currently active level.

25 Claims, 32 Drawing Sheets

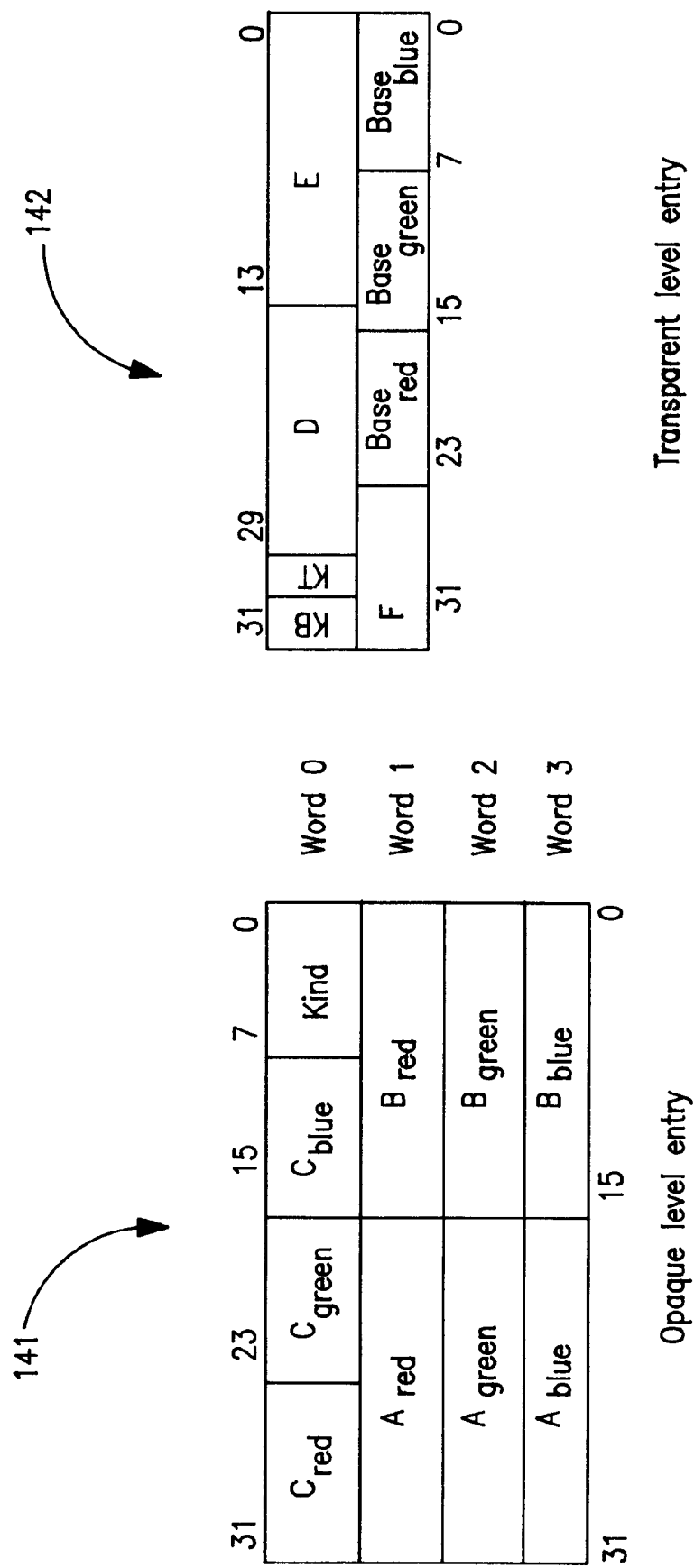
FIG. 29 Opaque level entry
FIG. 30 Transparent level entry

OBJECT BASED RENDERING SYSTEM FOR THE RENDERING OF IMAGES USING EDGE BASED OBJECT DESCRIPTIONS AND SETABLE LEVEL INDICATORS

FIELD OF THE INVENTION

The present invention relates to the composition of images utilizing a computer system in conjunction with a scanner and printer.

BACKGROUND ART

Complex computer generated images are normally made up of many different parts. These parts generally comprise graphic object-based data which form part of the image in addition to pixel-based scanned image data which, by itself, can also be considered to be an object. Hence, a final created complex image may consist of many thousands, if not millions, of objects which are layered on top of one another with differing degrees of transparency such that objects occurring below other transparent objects are partially visible through the transparent objects.

In most prior art systems for the creation of these images, it is necessary to "render" the objects to a frame buffer or memory storage device, with the frame buffer storing a pixel by pixel representation of the final image to be printed. The need for the use of a frame buffer is most often the consequence of a mismatch between the speed with which a complex image can be produced and the speed with which a final printing device can operate. Additionally, many printing devices impose strict timing specifications on the delivery of image data to be reproduced. Therefore, one way to meet these specifications is to render the image to form a pixel based image in a frame buffer and to print out the image pixel by pixel once it has been rendered. Of course, each image will have its own degree of complexity with a consequential limitation on the speed with which it can be rendered to the frame buffer.

The use of a frame buffer, with its pixel by pixel replication of the final image, imposes a large memory cost which adds to the expense of any final system incorporating the frame buffer. For example, common ink jet printing systems such as Canon's CJ10 can handle 24 bits per pixel color (8 bits of each of Red, Green, Blue), with a typical A4 page comprising 3,300 by 4,600 pixels or dots at 600 dots per inch (dpi). This is equivalent to 45 megabytes of data.

SUMMARY OF THE INVENTION

It is an object of the present invention to provide a more efficient method of rendering images which reduces the need to store so much data.

In accordance with one aspect of the present invention, there is provided a graphical object rendering system for the rendering of images from edge based object descriptions, into pixel based data. The system includes a buffer having an array of storage structures to hold pixel level data, with each pixel level data structure further comprising a series of setable level indicators, memory for storing an edged based object description of the desired image, each edge of each object having a level value corresponding to the level of the object, edge insertion means connected to the buffer and the memory, to alter the setable level indicators at locations corresponding to any intersection of said edges with said pixels, and highest object determination means to determine the object with the highest currently active level. The highest object determination means is connected to the buffer and, for each corresponding pixel level data structure of the array of pixel level data structures, determines the object with the highest currently active level.

In accordance with another aspect of the present invention there is disclosed a method of rendering an image from an object based description of the image to a description comprising a plurality of lines with each line made up of a plurality of pixels. Each of the objects having an associated level. The method including the steps of:

determining objects active on a current portion of a line of the image, determining the edges of the currently active objects, and storing the edge locations of the intersection of the edges of the currently active objects with the current portion of a line in a buffer at corresponding pixel positions. The method also includes the steps of reading the buffer in a pixel position by pixel position order, and determining the currently active highest edge from the reading of said buffer.

BRIEF DESCRIPTION OF THE DRAWINGS

A preferred embodiment of the present invention will now be described with reference to the accompanying drawings in which:

FIG. 29 illustrates an object's opaque level entry in the property table utilized in the preferred embodiment;

FIG. 30 illustrates an object's transparency level entry in the property table utilized in the preferred embodiment;

DETAILED DESCRIPTION

Figure 1:
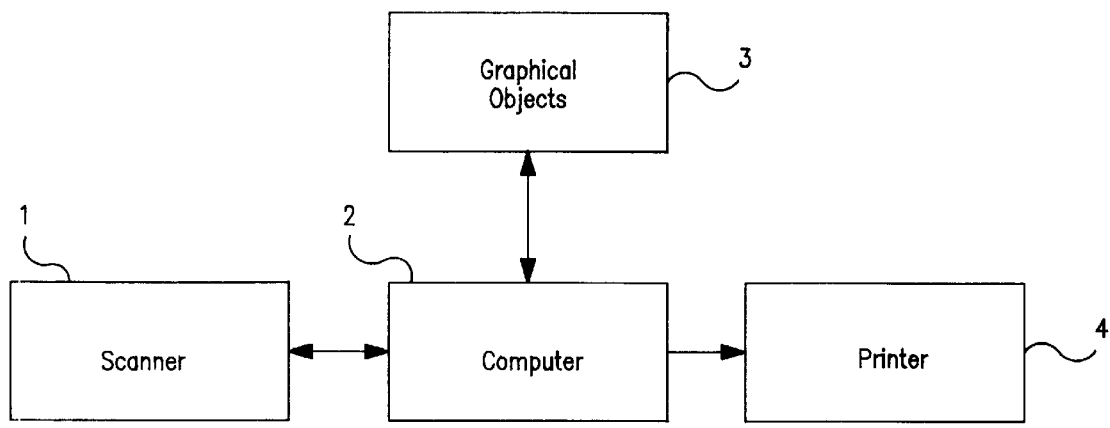
FIG. 1 is a schematic block diagram of the incorporation of the preferred embodiment into a printing system.

Referring now to FIG. 1, the preferred embodiment is designed to operate in an environment where images are scanned on a pixel by pixel basis by a scanner 1 with the pixels being transferred to a computer system 2. The computer system 2 is configured to utilize predefined graphical objects 3, stored on various internal and external media, which are combined with the scanned image from scanner 1 with the resultant image being printed out on a printer 4. Preferably, the printer 4 is a "banded" ink jet printing device such as the Canon CJ10 Ink Jet Printer. The Canon CJ10 is a "banded" printing device in that it prints an image by printing individual bands one after another.

Figure 2:
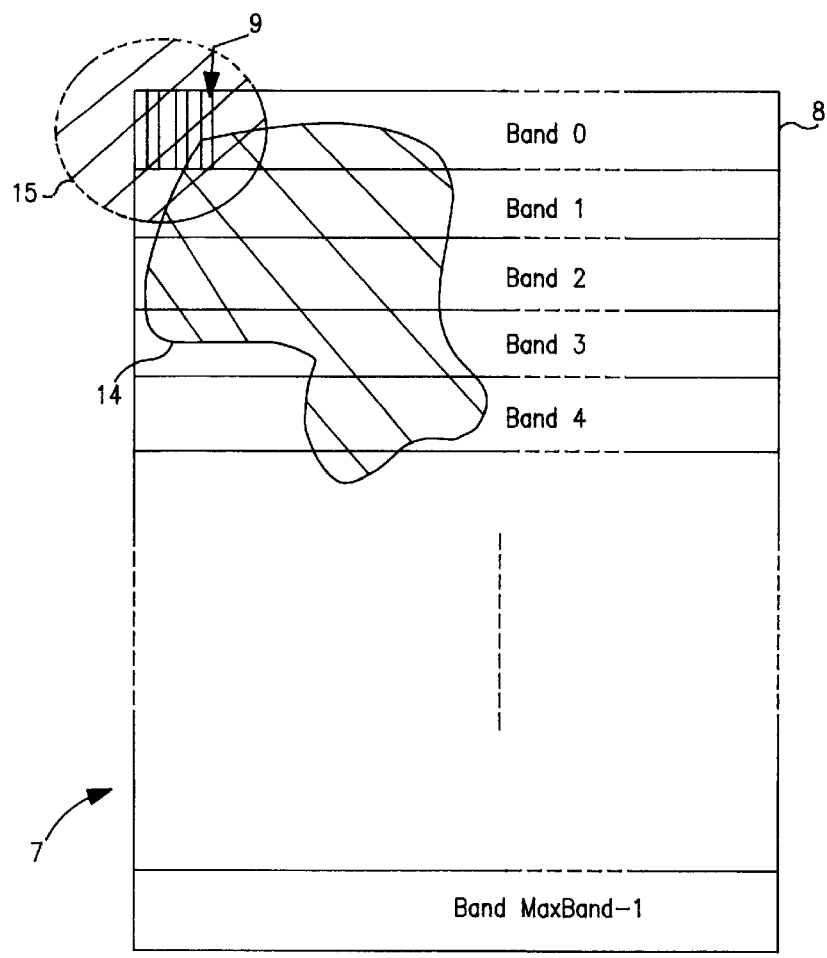
FIG. 2 illustrates the banded nature of the preferred output device.

Referring now to FIG. 2, there will now be explained the operation of a banded printing device with the preferred embodiment. A page 7 is created from a large number of bands 8 with each band being printed one after the other. Each band 8 is in turn made up of a large number of lines 9. Without loss of generality, it will be assumed that the lines are printed from the top to the bottom of each band. However, clearly other formats are possible.

Figure 3:
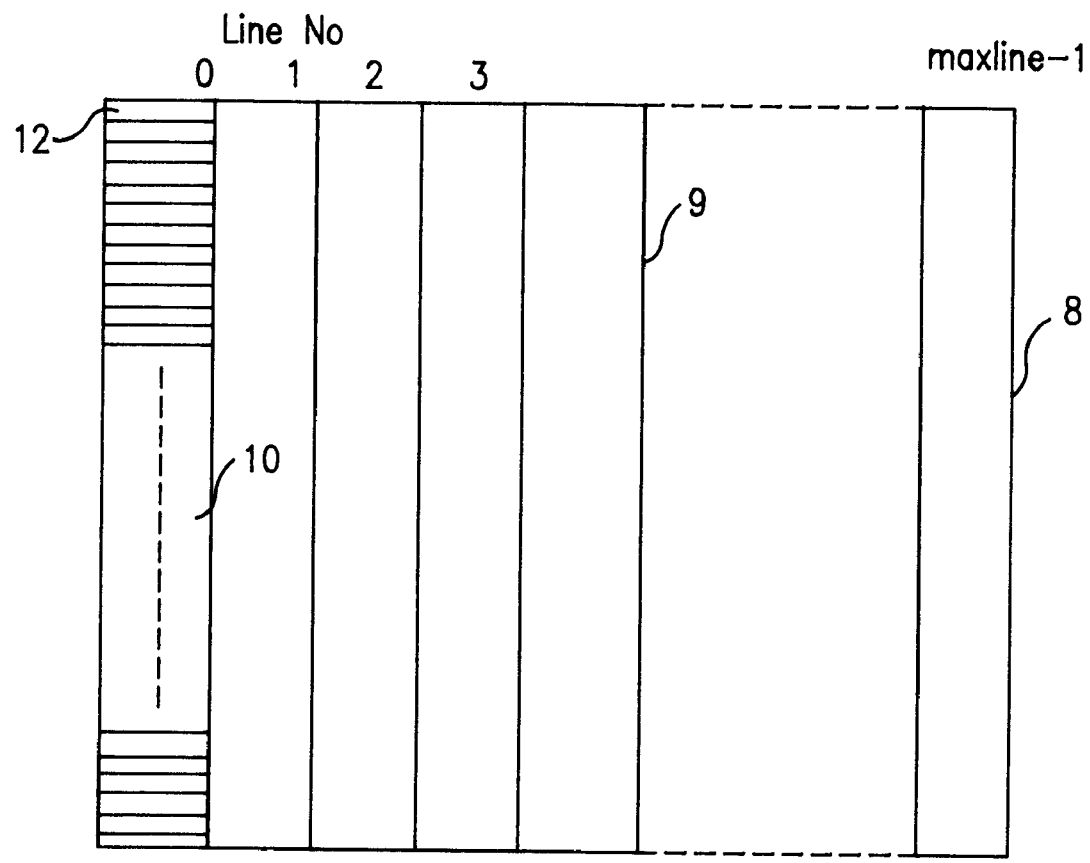
FIG. 3 illustrates a single band of FIG. 2 in more detail.

Referring now to FIG. 3, there is shown a single band 8. Each band 8 consists of a large number of lines 9, 10. Each line 9, 10 is further made up of a series of pixels 12. The pixel 12 is itself formed from a number of component colors, for example, it will be assumed that the component colors of each pixel are formed from cyan, magenta, yellow and black (CMYK). Further, as in common in the art, the pixel data sent to the printer 4 (FIG. 1) comprises Red, Green and Blue (RGB) color components with each component having 8-bits of color level information. The printer 4 uses known techniques to convert the RGB color data to corresponding CMYK color data which is subsequently printed out.

Referring again to FIG. 2, there is shown a simple example of two objects 14 and 15 which form a part of the overall image to be printed on page 7. As object 15 lies partially off the page 7, it is necessary for the computer system 2 (FIG. 1) to "clip" the object to the boundaries of the page 7. Ideally, the outline of each object 14,15 is represented by spline outline information. The use of splines is advantageous in that it allows efficient rotation, scaling and translation of arbitrary objects.

Figure 4:
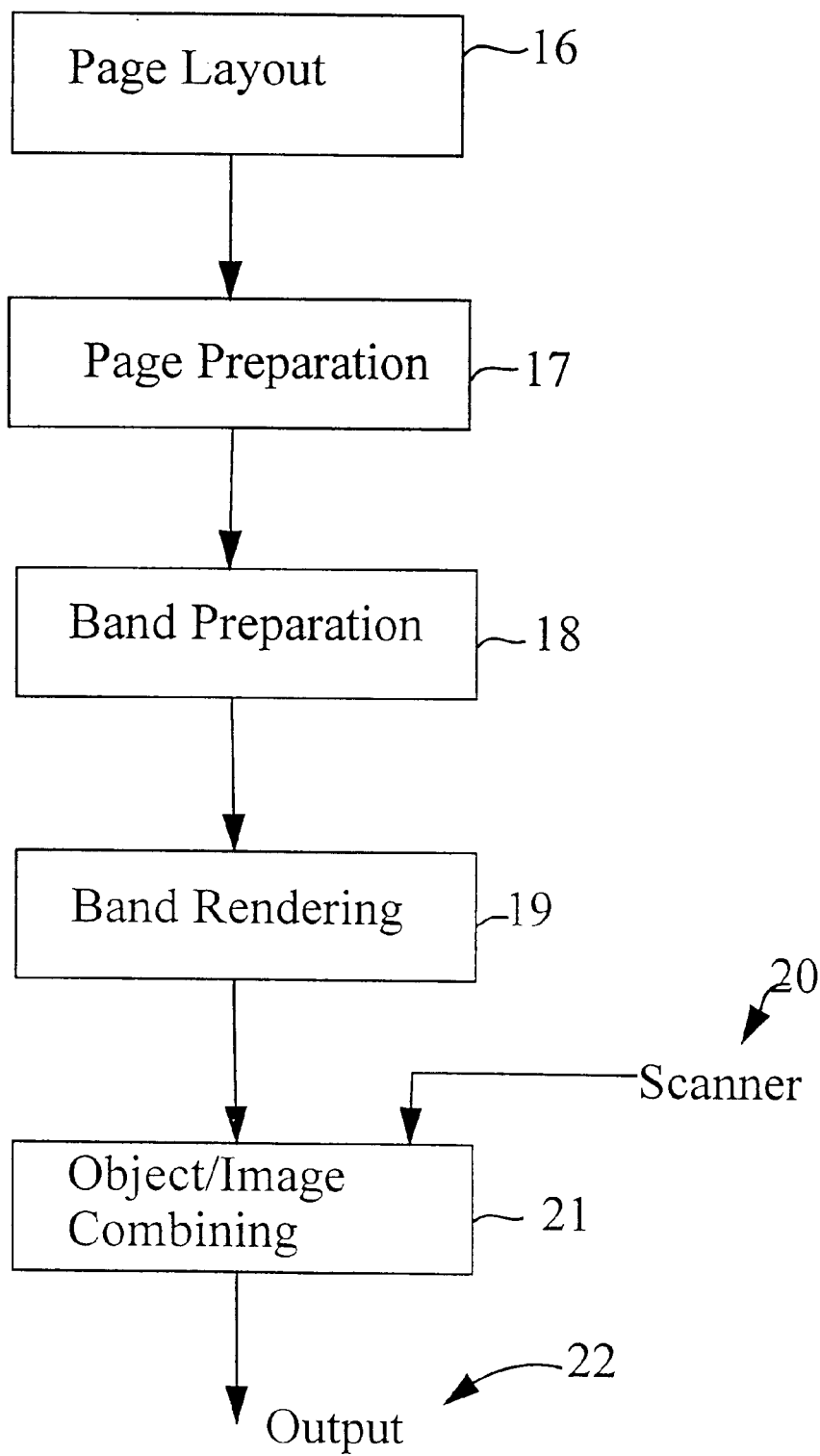
FIG. 4 is a flow chart illustrating the process of creating an output image for a printer device.

Referring now to FIG. 4, there will be described the process carried out in the rendering of images by the computer system 2 (FIG. 1). Information about the page layout is loaded into the system 16. Subsequently a simplified form of the objects describing the page is created 17. A band preparation stage 18 determines which objects are active in a current band of the printed page. A band rendering stage 19 converts the objects to a compact description on a line by line basis. An object/image combining stage 21 combines the computerized description of the object with incoming scanner data 20 to form an output 22 to the ink jet printing device. The operation of each of the stages of the rendering process will be further described hereinafter.

Referring now specifically to the page layout description stage 16, information about the layout of a page is loaded into the computer system. This information normally consists of objects which are to be printed. The objects in turn can be broken down into cubic splines which determine the outline of an object. Additionally, each object has associated with it a level number as well as information regarding its color properties and translation, rotation and skewing properties which should be applied to the object before it is rendered.

Figure 5:
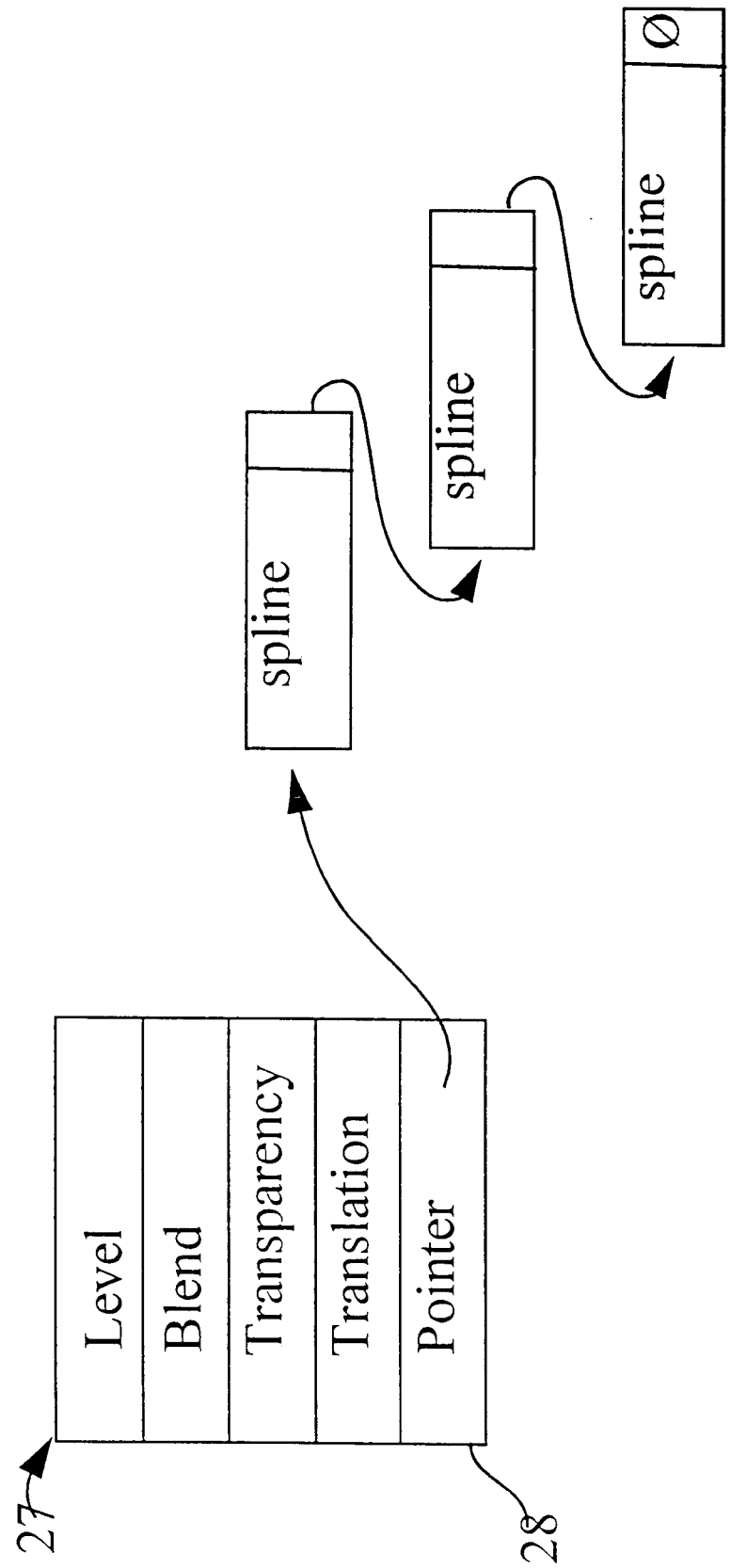
FIG. 5 illustrates the data structure of an object for display.

Referring now to FIG. 5, there is shown an object record 27. This record includes fields for Level, Blend, Transparency and Translation information in addition to a pointer 28 to a linked list which contains descriptions of splines which comprise the outline of the object.

Figure 6:
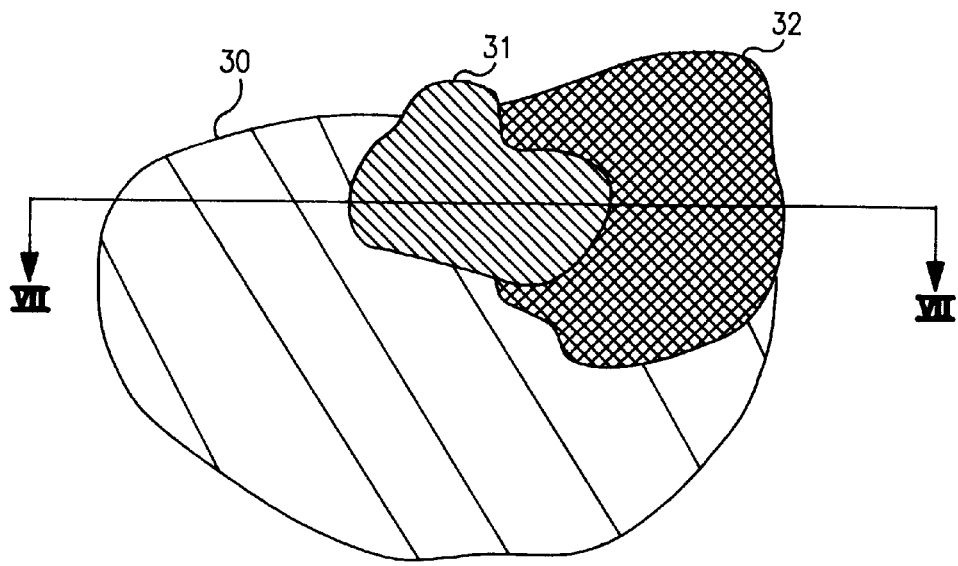
FIG. 6 illustrates multiple overlapping objects.
Figure 7:
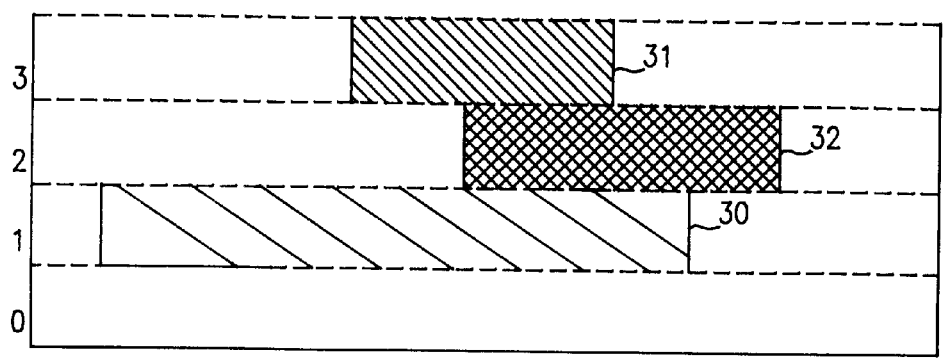
FIG. 7 illustrates the rendering process of the objects in FIG. 6.

The Level field of the object record 27 determines which of many layers or levels the object belongs to and is used to determine the visibility of an object. Referring now to FIG. 6 and FIG. 7 there is shown an example of the significance of an object's level. In FIG. 6, there is shown three objects 30, 31, 32, with object 30 being on a level below object 32 which is in turn on a level below object 31. FIG. 7 shows a cross section through the objects of FIG. 6 along the line VII—VII of FIG. 6. It can be seen that object 30 is on level 1, object 32 is on level 2 and object 31 is on level 3. Therefore, in printing the line along VII—VII, object 31 takes precedence over the other objects and is printed in preference to those objects.

If object 31 is active and opaque, the output color printed will be that stored with the color information of object 31. If object 31 is active and defined to be partially transparent, then the output color will be a combination of the color of object 31 and the color of object 32 underneath it (assuming object 32 is opaque). Hence objects can be partially, or wholly, transparent, with the combining of object colors to be further described hereinafter.

Referring again to FIG. 5, the Blend field of the object record 27 contains nine values that define three planes in the color space of the object. As will be further described below, this information is enough to describe a linear blend of any colors in any direction.

The Transparency field of the object record 27 contains three pairs of values which, as will also be further described below, define the degree of transparency of the object. An object is transparent when portions of the object below the transparent object show through the transparent object in the final image.

The Translation field of the object record 27 defines the conventional translation, rotation, scaling and skewing that are to be applied to all the splines belonging to an object as well as to the color blend information of an object.

Referring again to FIG. 4, the next step in the preparation of an image is the page preparation step 17. The page preparation step 17 involves all the necessary software operations that need to be performed before the image can be rendered. These include:

1. The geometric transformations which are to be applied to all splines belonging to an object in addition to the object's blend description.
2. The clipping operations to be applied to objects or parts thereof.
3. The preparation for each band in a final image of a linked list of objects intersecting that band.

1. Geometric Transformation

The description of each object is stored in terms of a series of location values, the values of which are stored with respect to a first co-ordinate system. The Translation field of an object's description contains the information necessary to transform the object's description into page co-ordinates (page line and pixel number). This information is applied to the object to produce a description of the object with reference to page co-ordinates.

2. Page Clipping

After the geometric transformations have been applied to each object, there can be objects that lie outside the page boundaries, in addition to objects which can lie partially in and partially out of the page boundaries.

Figure 8:
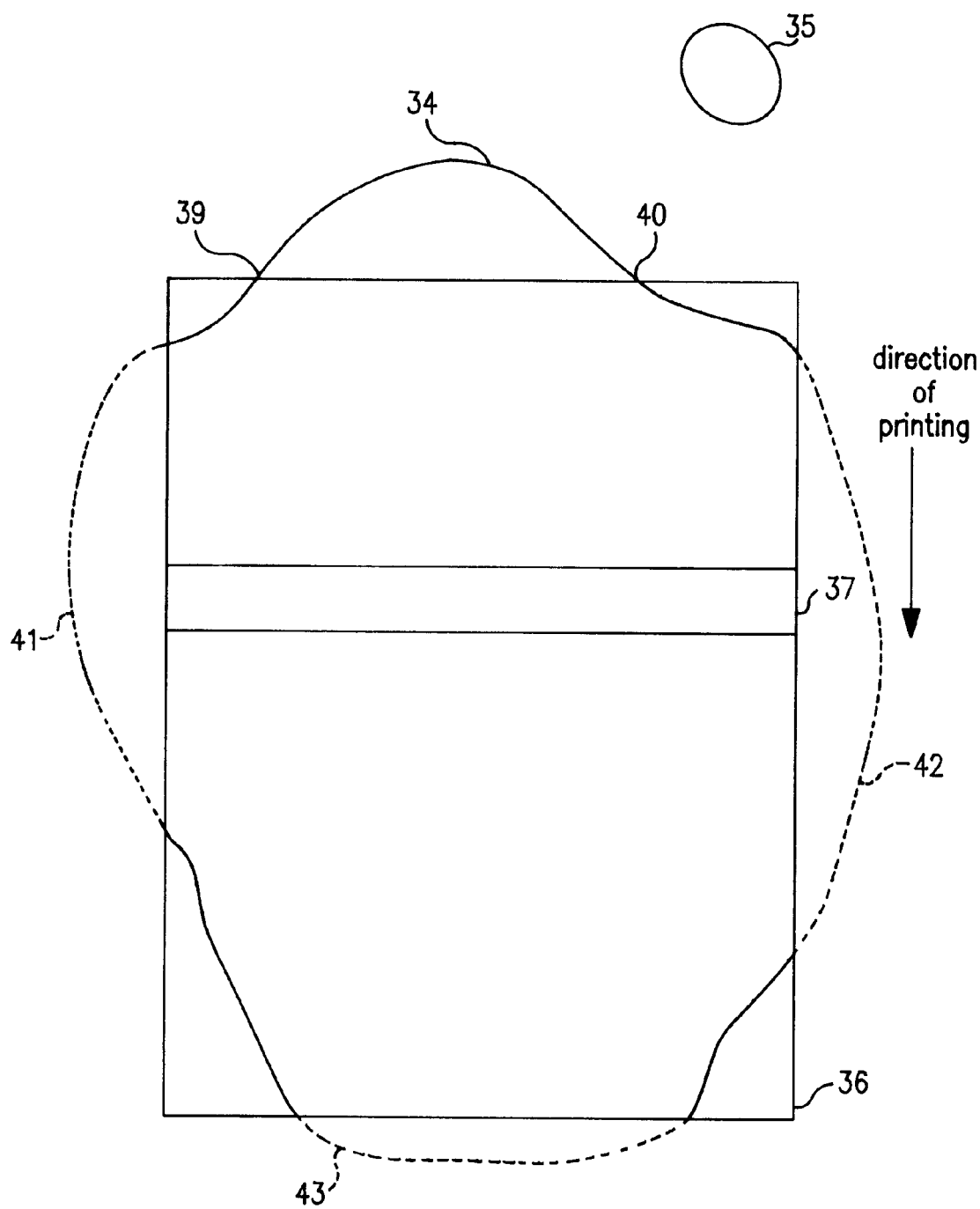
FIG. 8 illustrates the process of "culling" objects from an image.

Referring now to FIG. 8 there is shown an example of the clipping process with two objects 34 and 35 of an image which is to be printed on a page 36 by bands 37. It can be seen that object 35 lies totally off the output page 36 and therefore can be deleted or culled from the description of the page 36. This has the effect of substantially speeding up subsequent stages of the printing process. Object 34 lies partially on and partially off the printed page 36 and a clipping process is applied to the object 34 to also speed up the subsequent stages of the printing process. The first step to be applied is the simplification of that portion of the object 34 lying off the top of the page 36. The splines making up the portion of the object lying off the top of the page between the points 39 and 40 are removed and replaced by a straight edge (which is still in a spline format), between the points 39 and 40. Those portions of the object that lie off the sides and to the bottom of the page 41, 42, 43 are also replaced by straight edges to further simplify the description of the object 34.

3. Preparation of the Object Band Intersection List

Figure 9:
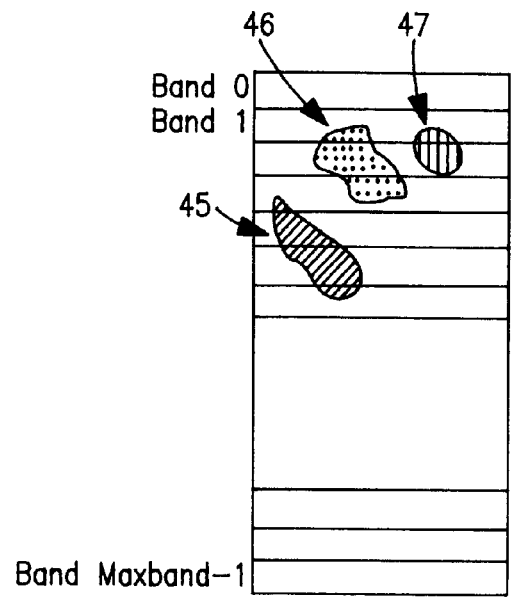
FIG. 9 illustrates a sample image.
Figure 10:
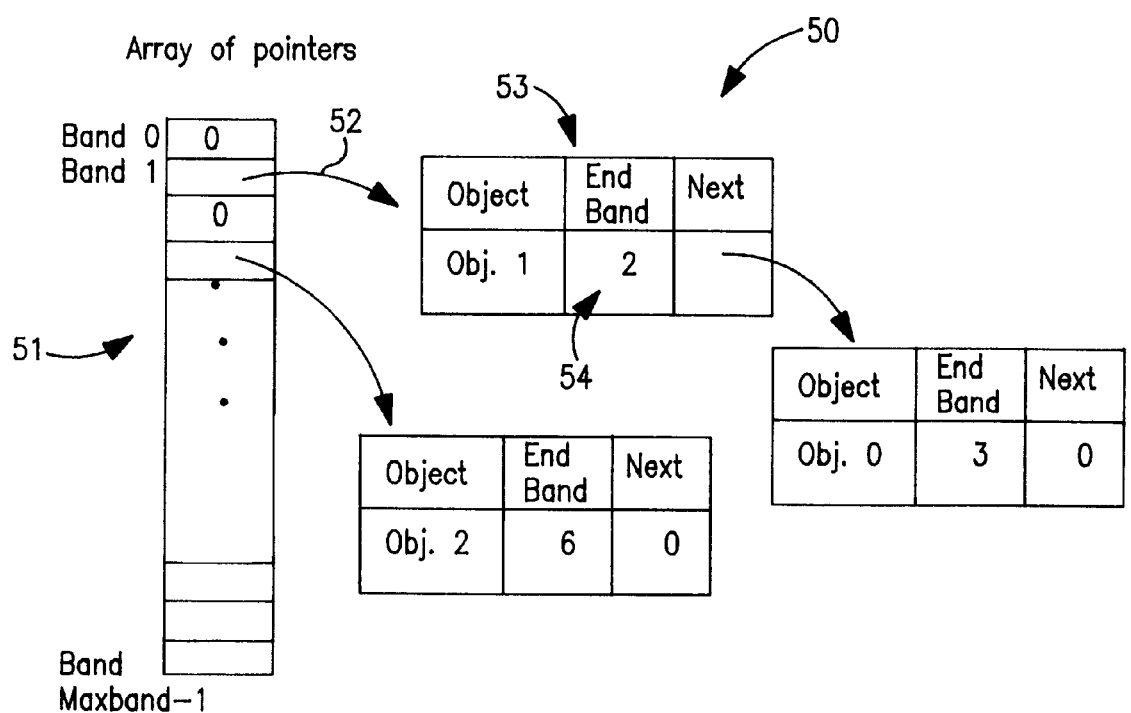
FIG. 10 illustrates the band object intersection list for the image of FIG. 9.

The next stage of the preparation process involves forming an object band intersection list which defines a structure that, for each band, indicates those objects which intersect the band. Referring now to FIGS. 9 and 10 there is shown an example of band intersection list formation. In FIG. 9 there is shown the output page which includes objects 45, 46 and 47. In FIG. 10, there is shown the corresponding band object intersection list 50 for the image of FIG. 9. The band object intersection list 50 includes an array of pointers 51. The number of elements in the array 51 corresponds to the number of bands in a printed page. Each element of the array 51 contains a pointer 52 which points to a linked list of all the objects 53 that start in that particular band. Each element 53 of the link list includes a record containing the object's description and the last or end band that the object intersects with, in addition to a pointer to the next element of the linked list.

The band object intersection list 51 can be built as the objects are loaded into the computer system 2, after the geometric transformations has been applied to each object. This is done by calculating a bounding box for each object which will in turn indicate in which band the objects starts and in which band the object ends. The object's description and the bounding box can then be used to construct the object record 53, with the record then being appended to the list pointer 52 for the relevant starting band of the object.

The object band intersection list will therefore comprise a linked list of the objects starting at that band. This is very useful in determining, for each band, those objects which intersect the band and saves substantial amounts of time whenever a band preparation or render operation is performed on the objects to be displayed.

Banded ink jet printing devices, such as the Canon CJ10, print their image band by band with a arbitrary time between the end of the printing of one band and the start of the printing of the next band. Therefore, the page preparation process 17 (FIG. 4) maintains an additional active object list as each band is prepared and rendered. This active object list is initially empty before the first band is printed. Every time a new band is ready for preparation, all the objects in the object intersection list which start at that band are appended to the active object list. The active object list is then forwarded to a band preparation process 18 (FIG. 4). As a result, the band preparation process 18 only deals with those objects intersecting the current band. If the current band is the last intersecting band of an object 54 (FIG. 10), the object is deleted from the active object list.

Figure 11:
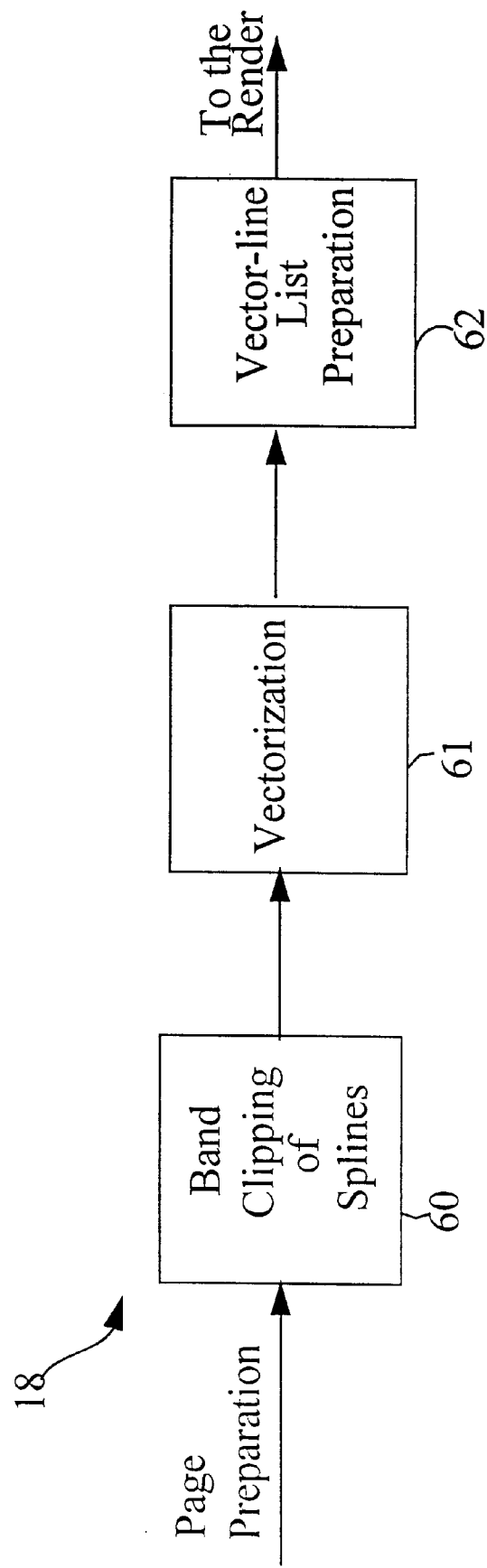
FIG. 11 illustrates the band preparation process of the preferred embodiment.

Referring now to FIG. 11, there is shown the band preparation process 18 of FIG. 4 in more detail. The band preparation process includes the clipping of splines 60 to the borders of a band, the vectorization of each spline 61 into line segments, and the preparation of a line intersection list 62 for the current band.

Band Clipping of Splines

Figure 12:
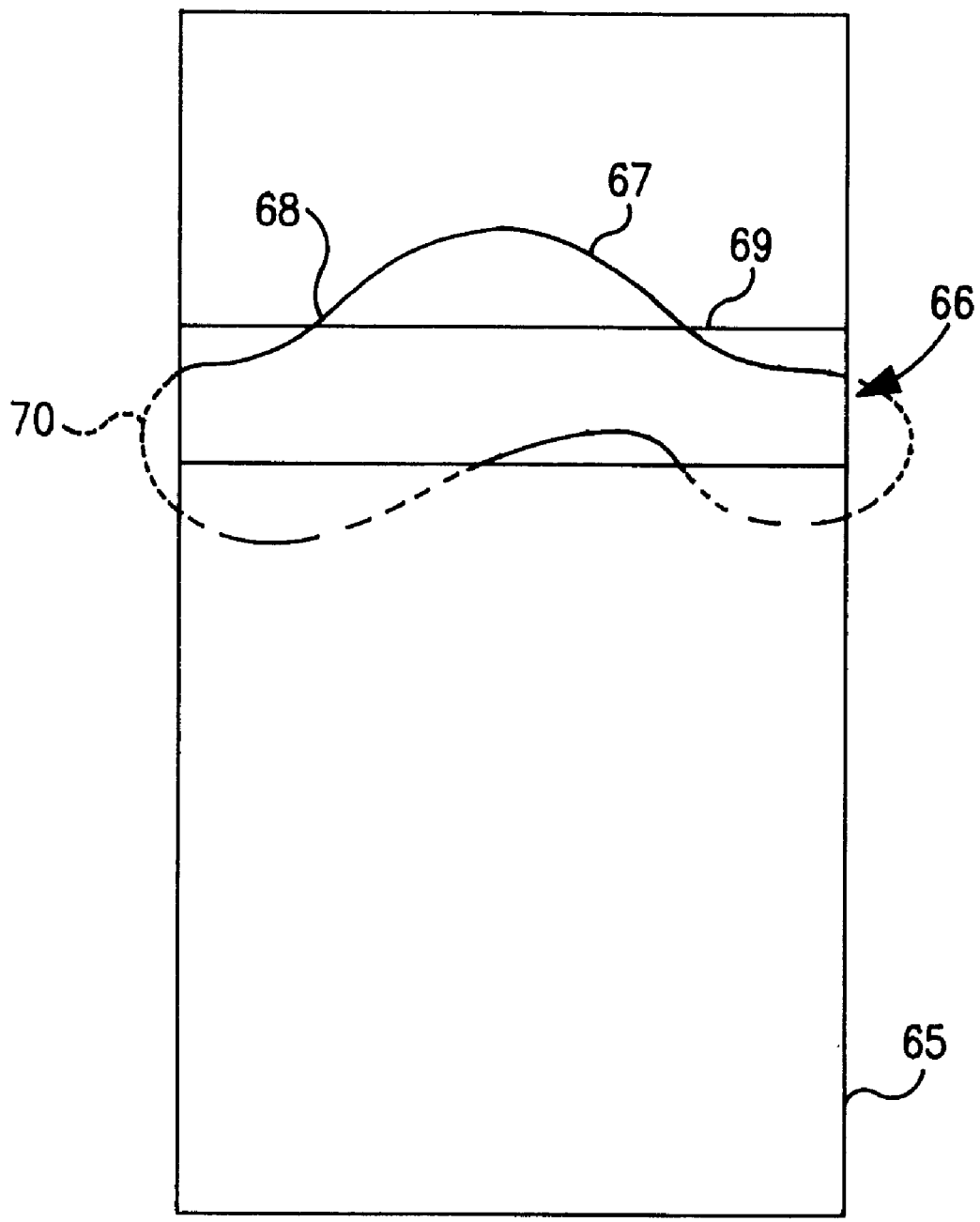
FIG. 12 illustrates the process of culling portions of an object from a particular band which is to be printed.

As mentioned previously, the band preparation process 18 (FIG. 4) is passed a list of objects which are active in the current band. Each object comprises a number of splines which describe its outline and the band clipping process is responsible for eliminating those splines which occur outside the current band, and for simplifying those splines which are partially inside and partially outside the current band. Referring now to FIG. 12, there is shown an example of the band clipping process. An object 67 is to be rendered on a current band 66 of a printed page 65. Those portions of the object 67 which are above the current band can be simplified to straight lines on the edge of the current band. For example, the portion of the object 67 between the band edges 68 and 69 can be simplified to a straight line between these two points. Similarly, those portions of the object 67 below and to the sides of the current band (eg. 70) can be deleted from the current object list. The result of the band clipping process is a list of the splines of an object which are active in the current band 66.

Spline Vectorization

Referring again to FIG. 11, the next stage in the band preparation process is the vectorization of splines into line segments 61. The spline vectorization process 61 converts all the splines of an object into vectors or line segments.

The parametric equation for a spline on an x,y plane is given as follows:

$$x(t)=at^3+bt^2+ct+d \quad \text{(EQ 1)}$$

$$y(t)=et^3+ft^2+gt+h \quad \text{(EQ 2)}$$

Figure 13:
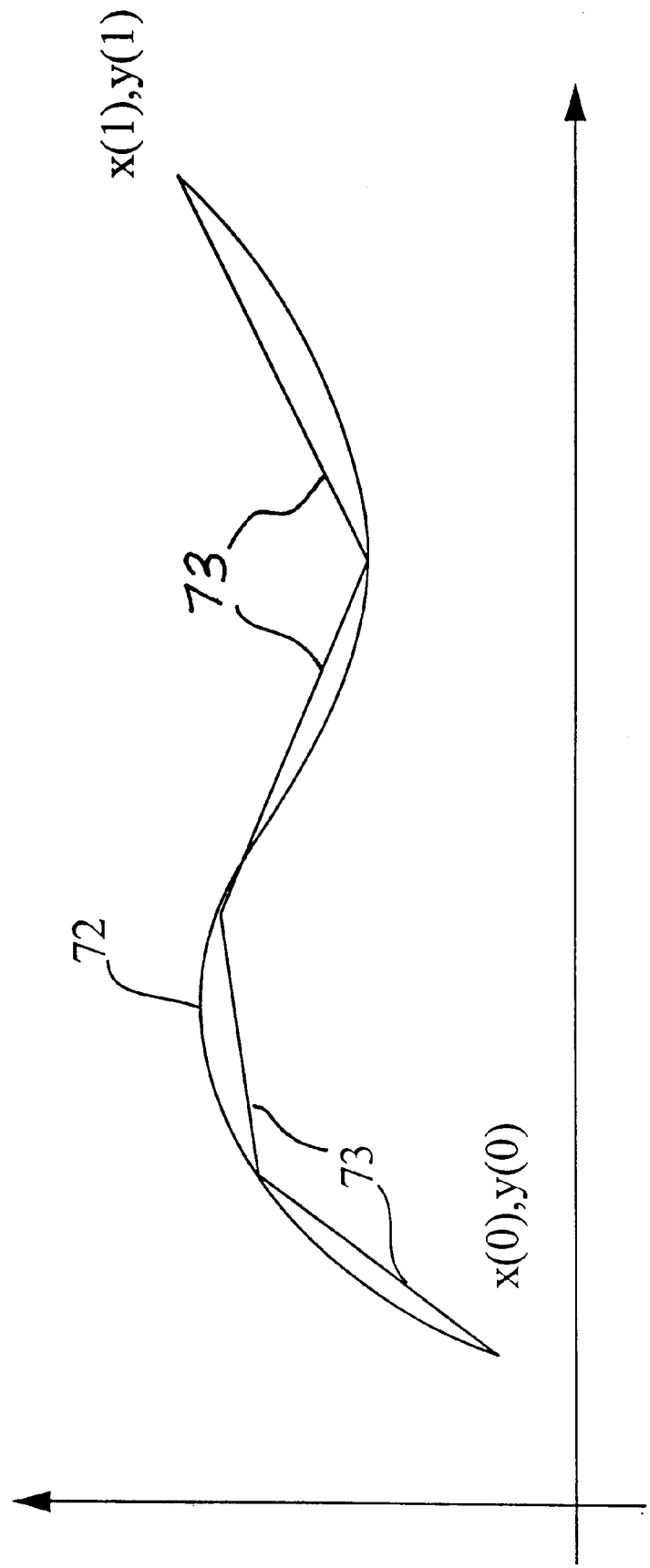
FIG. 13 illustrate the process of vectorizing a spline into corresponding line segments.

One method of converting the above equation into line segments is to sample the equations for the spline along a predetermined number of points equally spaced in the parametric space. The variable t is normally in the range from 0 to 1 and other ranges can be suitably scaled in a known manner so that t can take this range of values. Referring now to FIG. 13, there is shown an example of the process whereby a spline 72 ranging from the point x(0), y(0) to x(1), y(1) is converted into line segments 73 which are equally spaced in parametric space.

Of course, this technique may be unsuitable in that the obtained approximation to the spline may be potentially too coarse. However, since the computational costs of splitting the spline is minimal when compared with checking the error associated with the split, suitable performance can be obtained by merely splitting the spline many more times than that which would be required on average.

Splitting the spline along equally spaced points in parametric space is a simple process as Equations 1 and 2 are polynomials in t. Therefore the following recurrence relations can be used.

$$x_{k+1}=x_k+\Delta x_k \quad \text{(EQ 3)}$$

$$\Delta x_{k+1}=\Delta x_k+\Delta\Delta x_k \quad \text{(EQ 4)}$$

$$\Delta\Delta x_{k+1}=\Delta\Delta x_k+\Delta\Delta\Delta x_k \quad \text{(EQ 5)}$$

$$y_{k+1}=y_k+\Delta y_k \quad \text{(EQ 6)}$$

$$\Delta y_{k+1}=\Delta y_k+\Delta\Delta y_k \quad \text{(EQ 7)}$$

$$\Delta\Delta y_{k+1}=\Delta\Delta y_k+\Delta\Delta\Delta y_k \quad \text{(EQ 8)}$$

If $\Delta t=1/n$ where n is the number of splits, then the initial conditions for the above recurrence relation are $$x_0=d \quad \text{(EQ 9)}$$

$$\Delta x_0=3a\Delta t^2+2b\Delta t+c \quad \text{(EQ 10)}$$

$$\Delta\Delta x_0=6a\Delta t+2b \quad \text{(EQ 11)}$$

$$\Delta\Delta\Delta x_0=6a \quad \text{(EQ 12)}$$

$$y_0=h \quad \text{(EQ 13)}$$

$$\Delta y_0=3e\Delta t^2+2f\Delta t+g \quad \text{(EQ 14)}$$

$$\Delta\Delta y_0=6e\Delta t+2f \quad \text{(EQ 15)}$$

$$\Delta\Delta\Delta y_0=6e \quad \text{(EQ 16)}$$

The use of the above recurrence relations allows for a simple calculation of subsequent x,y points from a current x,y point and, if the number of desired line segments is a power of 2, the points can be calculated without the need for complex floating point arithmetic operations.

One simple heuristic for determining the number of line segments in which to break up a spline is to measure the perimeter of the bounding box of the spline. The larger the perimeter the greater the number of line segments into which the spline should be split.

Figure 14:
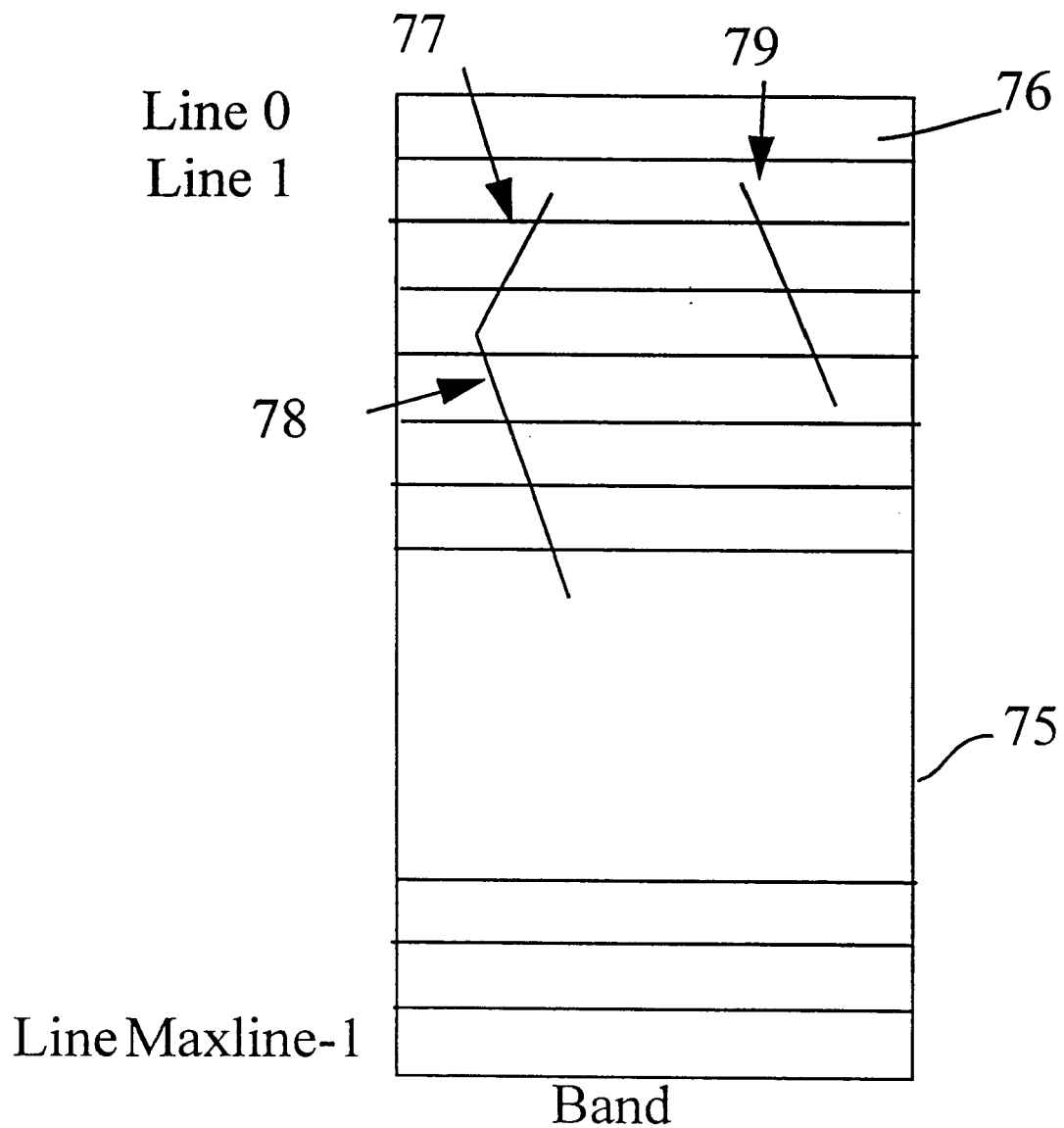
FIG. 14 illustrates a number of line segments within a band which is to be rendered.
Figure 15:
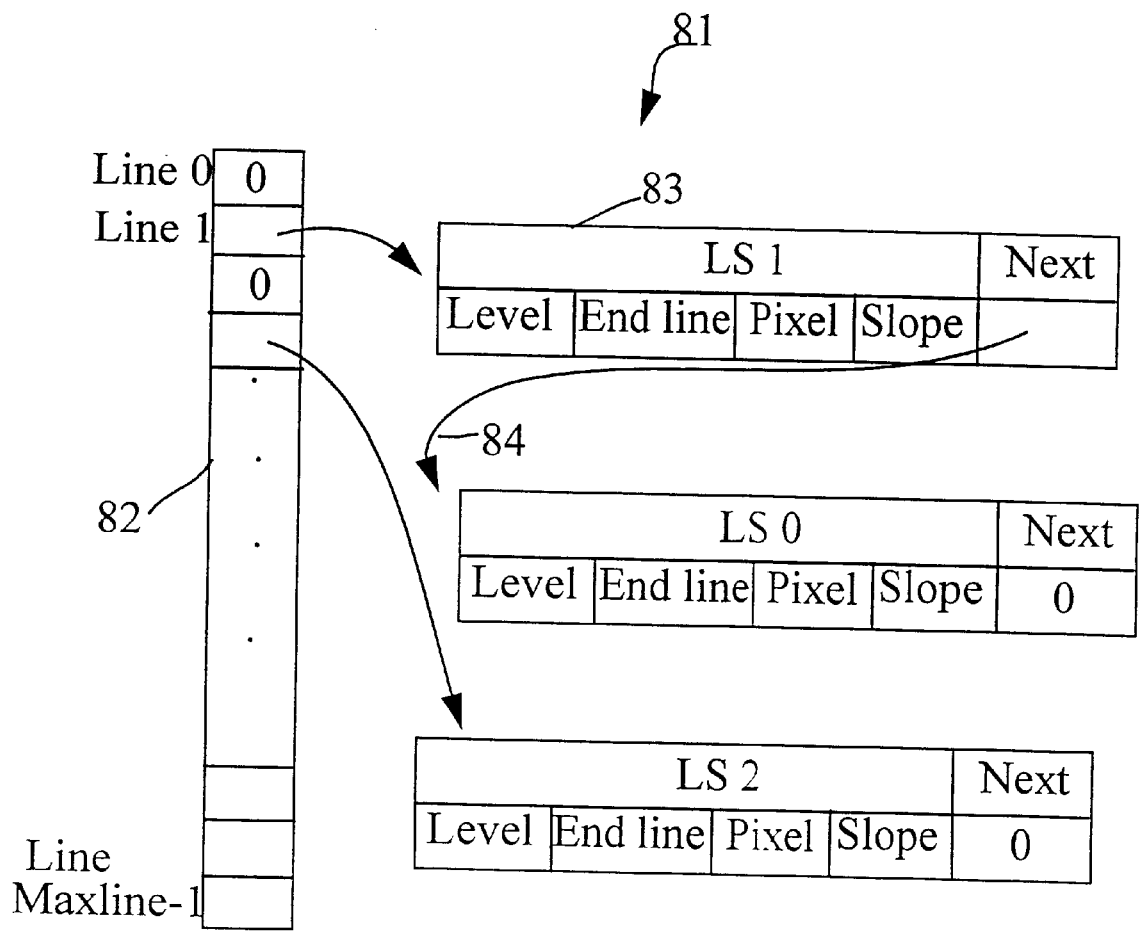
FIG. 15 illustrates the vector line intersection list for the band of FIG. 14.

The result of the spline vectorization process is a list of line segments for each spline. These lines segments are inserted in a vector-line intersection list which will now be described with reference to FIGS. 14 and 15. FIG. 14 shows an example band 75 which comprises a multiplicity of lines 76 numbered from 0 to (maxline −1). This particular band 75 has three line segments 77, 78 and 79 which have been formed as a result of the spline vectorization process and are to be rendered within the current band. FIG. 15 shows the vector line intersection list 81 which stores all the active lines within the current band 75 and is of a similar nature to the object band intersection list 51 of FIG. 10. The vector line intersection list 81 includes an array of pointers 82 with the number of elements in the array 82 being equal to the number of lines in the band. Each element in the array 82 points to a list of the line segments 83 which begin on that line. Each line segment 83 in the link list contains a description of the line segment and a pointer 84 to the next list element. The information stored on each line segment includes:

1. Level information indicating the level of the object that the line segment belongs to;
2. End line information which describes the last line on which the line segment is active;
3. Pixel information which describes the pixel on a line that the line segment currently intersects; and
4. Slope information which describes the slope of the line segment and can be used to update the pixel information value after the printing of each line.

Referring now to FIG. 11, the vector line list is created 62 at step after each spline has been vectorized 61. As seen in FIG. 4, the creation of the vector line intersection list completes the band preparation stage 18, with the next stage being the band rendering stage 19. The page layout description stage 16, the page preparation stage 17 and the band preparation stage 18 are all carried out in software, with the band rendering stage 19 and the object and image combining stage 21 being carried out in hardware.

Figure 16:
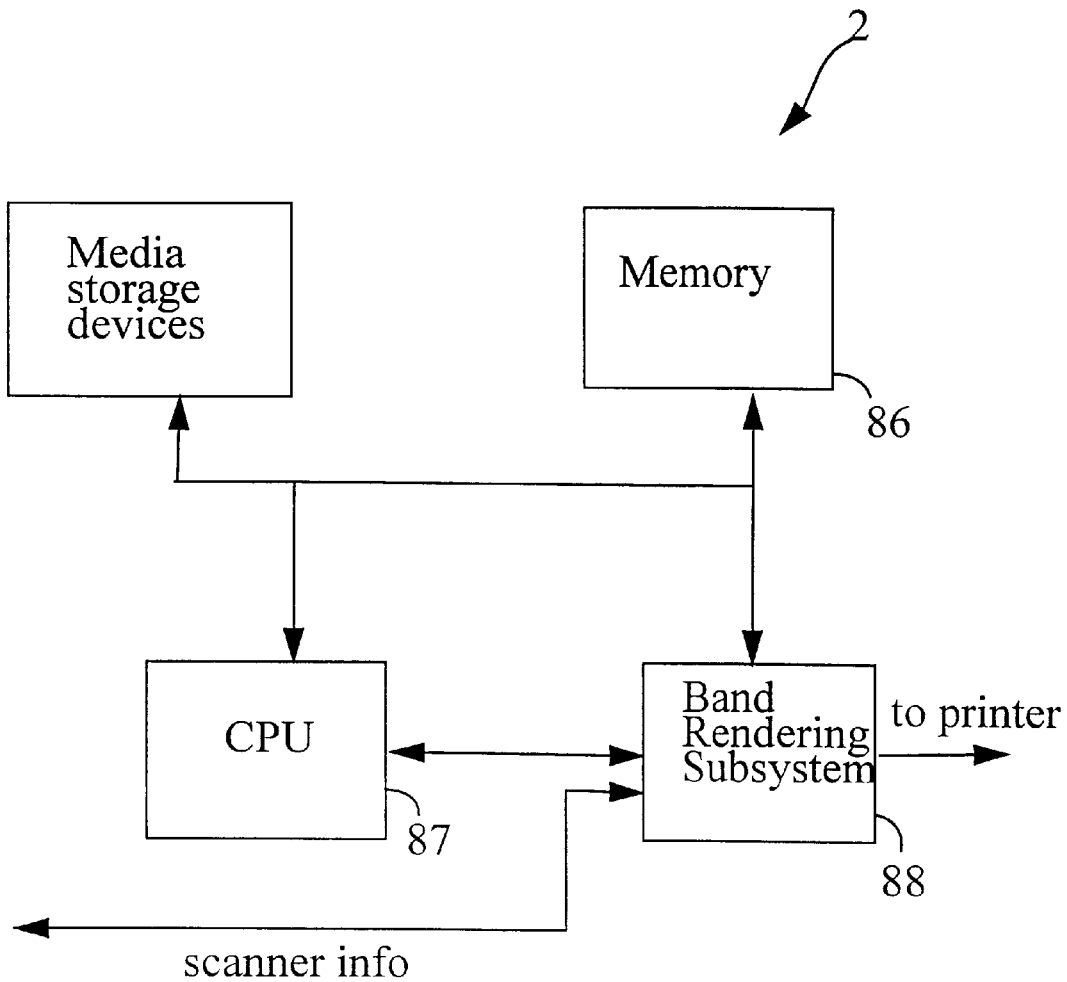
FIG. 16 illustrates the computer system of FIG. 1 in more detail.

Turning now to FIG. 16, there is shown the computer system 2 of FIG. 1 in more detail. The computer system 2 includes a memory 86, a central processing unit (CPU 87) and a band rendering subsystem 88. The CPU 87 is responsible for the preparation steps 16, 17, 18 of FIG. 4, storing the results in the memory 86. The band rendering subsystem 88 is responsible for the stages 19 and 21 of FIG. 4.

Figure 17:
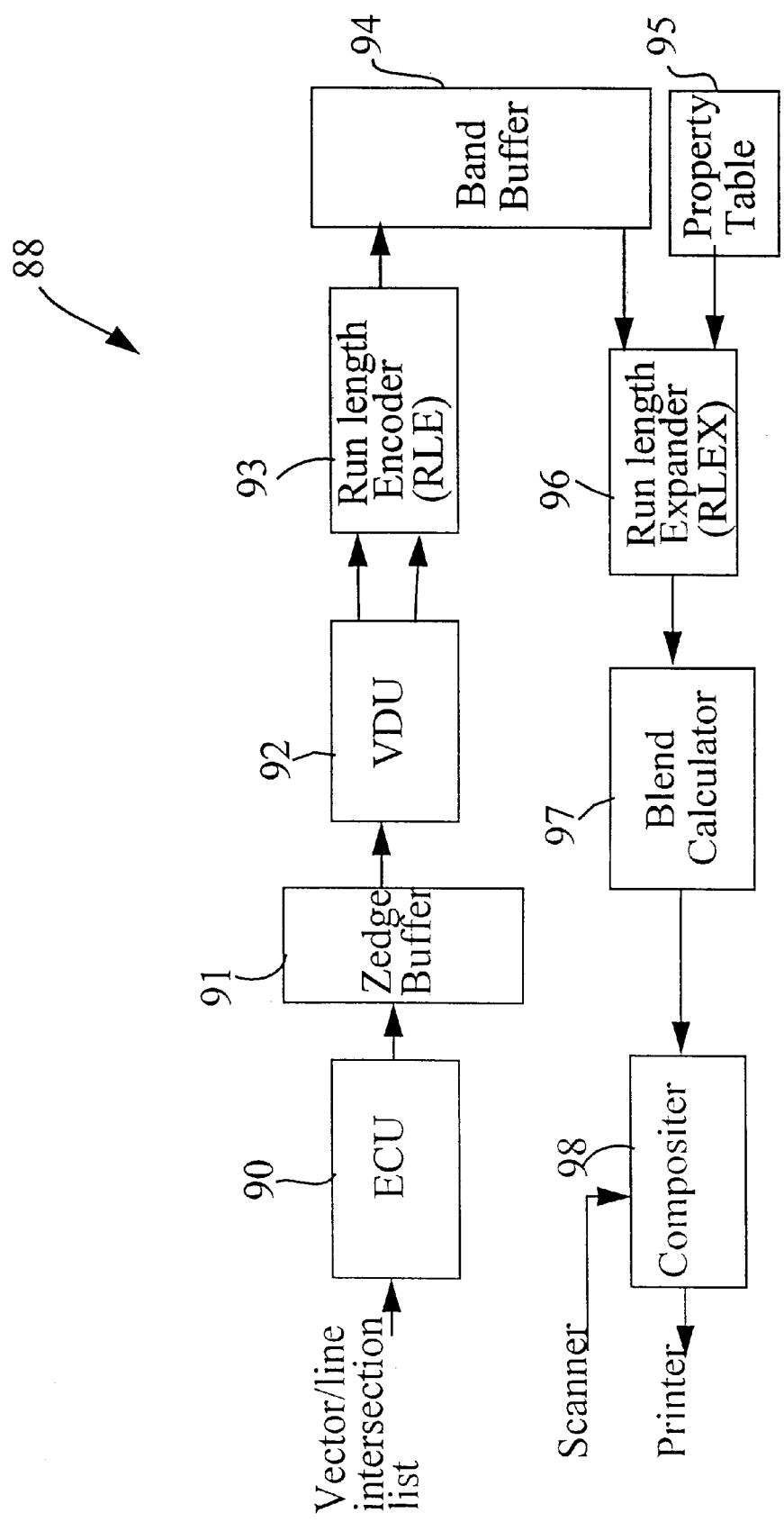
FIG. 17 illustrates the data flow through the band rendering subsystem of FIG. 16.

Referring now to FIG. 17, there is shown the data processing flow through the band rendering subsystem 88. The band rendering subsystem 88 includes an edge calculation unit (ECU) 90 which takes as its input the vector line intersection list of FIG. 15 and calculates the intersection of the various line segments with a current scan line. This process is completed by traversing the vector line intersection list and updating the pixel values for a current scan line. Once calculated, the edges are stored in a "Zedge" buffer 91, which is a specialised form of buffer to be further described herein below. A visibility determination unit (VDU) 92 reads values from the Zedge buffer 91 and performs hidden surface removal to determine the current top transparent and top opaque level objects. The top level object values are sent to a run length encoder (RLE) 93 that transforms the object level information for each pixel into run length information, before storing the run length information in a band buffer 94. The use of the RLE 93 greatly reduces the necessary size of band buffer 94 and also the necessary bandwidth to memory when compared with storing the pixel information for each pixel on a line individually. This bandwidth reduction is effective during both the storage and the subsequent printing of the image.

From the description of each object stored in memory 86 (FIG. 16), each objects' level, color and transparency information is determined and stored in a property table 95 which is stored in another area of the memory 86, which is usually implemented by DRAM devices.

Once a whole band has been stored in the band buffer 94 and is ready to be printed, a run length expander (RLEX) 96 reads the band from band buffer 94, expands all the run length encoded band information and passes the information to a blend calculator 97. The blend calculator 97 computes the necessary color and transparency blends and sends them to a compositor 98.

The compositor 98, which either works on the same clock cycle as the output device such as Canon CJ10 Ink Jet Printer, or has its output data subsequently synchronised with the output device 4, combines the information from blend calculator 97 with the data from the copier scanner 1 (FIG. 1) to produce the final pixel output for the printer device 4 (FIG. 1).

Figure 18:
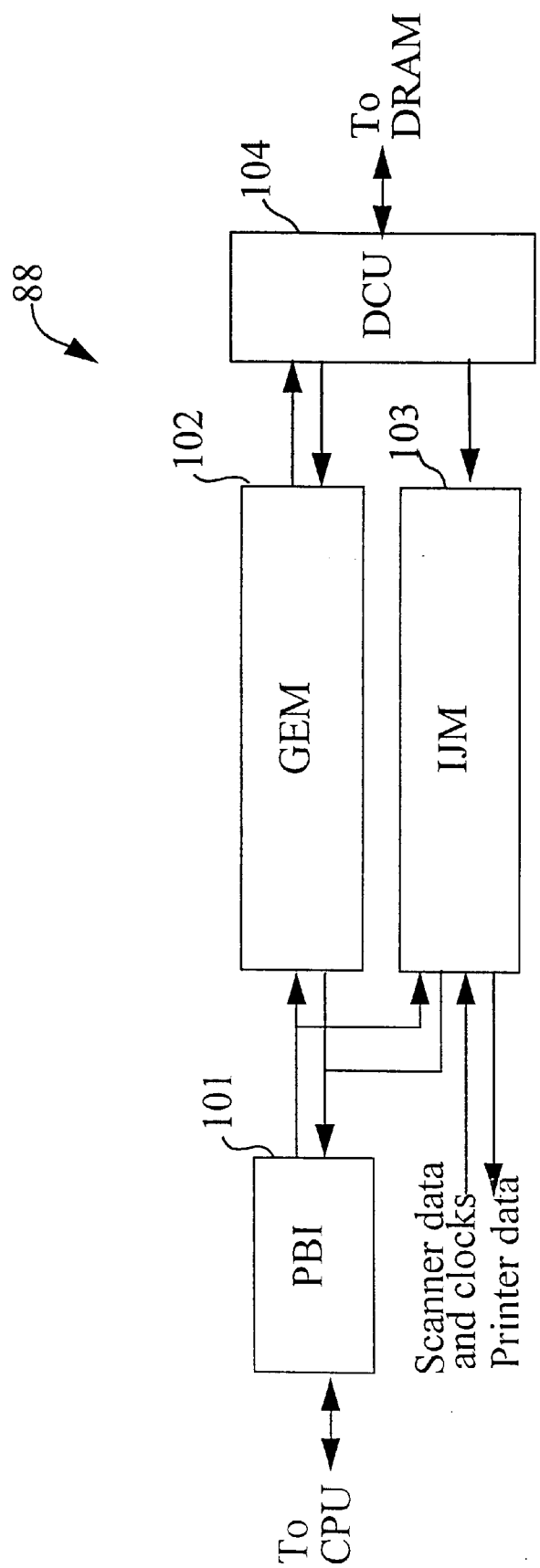
FIG. 18 is a schematic block diagram of the band rendering subsystem of FIG. 16.

Referring now to FIG. 18 there is shown an actual implementation of the band rendering subsystem 88 of FIG. 16. The band rendering subsystem 88 includes a processor bus interface (PBI) 101 which interacts with the CPU 87 (FIG. 16) and controls the overall operation of the band rendering subsystem 88. A graphics engine module (GEM) 102 contains the ECU 90, VDU 92 and RLE 93 of FIG. 17. An Ink Jet Module (IJM) 103 contains the RLEX 96, the blend calculator 97 and the compositor 98 of FIG. 17. The Zedge buffer 91, the band buffer 94 and the property table 95 are all stored in DRAM memory 86 (FIG. 16) and are accessed by the band rendering subsystem 88 through a DRAM control unit (DCU) 104. The processor bus interface 101 includes a four bit internal control register which controls the various modules within the band rendering system 88. The contents of this register are as listed in the table below.

TABLE 1

The Control Register

| Bit | Name | Description |
|---|---|---|
| 0 | GEMGO | When this bit is set, the GEM starts operation. |
| 1 | ENECU | ECU enable bit. When set the ECU is enabled. |
| 2 | ENRU | RU enable bit. When set the RU is enabled. |
| 3 | IJMGO | When this bit is set then the IJM starts operation. |

The GEMGO bit starts the operation of the GEM 102. When the GEM 102 has completed its operations it notifies the PBI 101. The PBI 101 then sets the IJMGO bit which initiates the operation of the IJM 103. The ENECU bit and the ENRU bit are provided to test the ECU 90 (FIG. 17) and a render unit (RU) 108 which will be described hereinafter with reference to FIG. 23.

Figure 19:
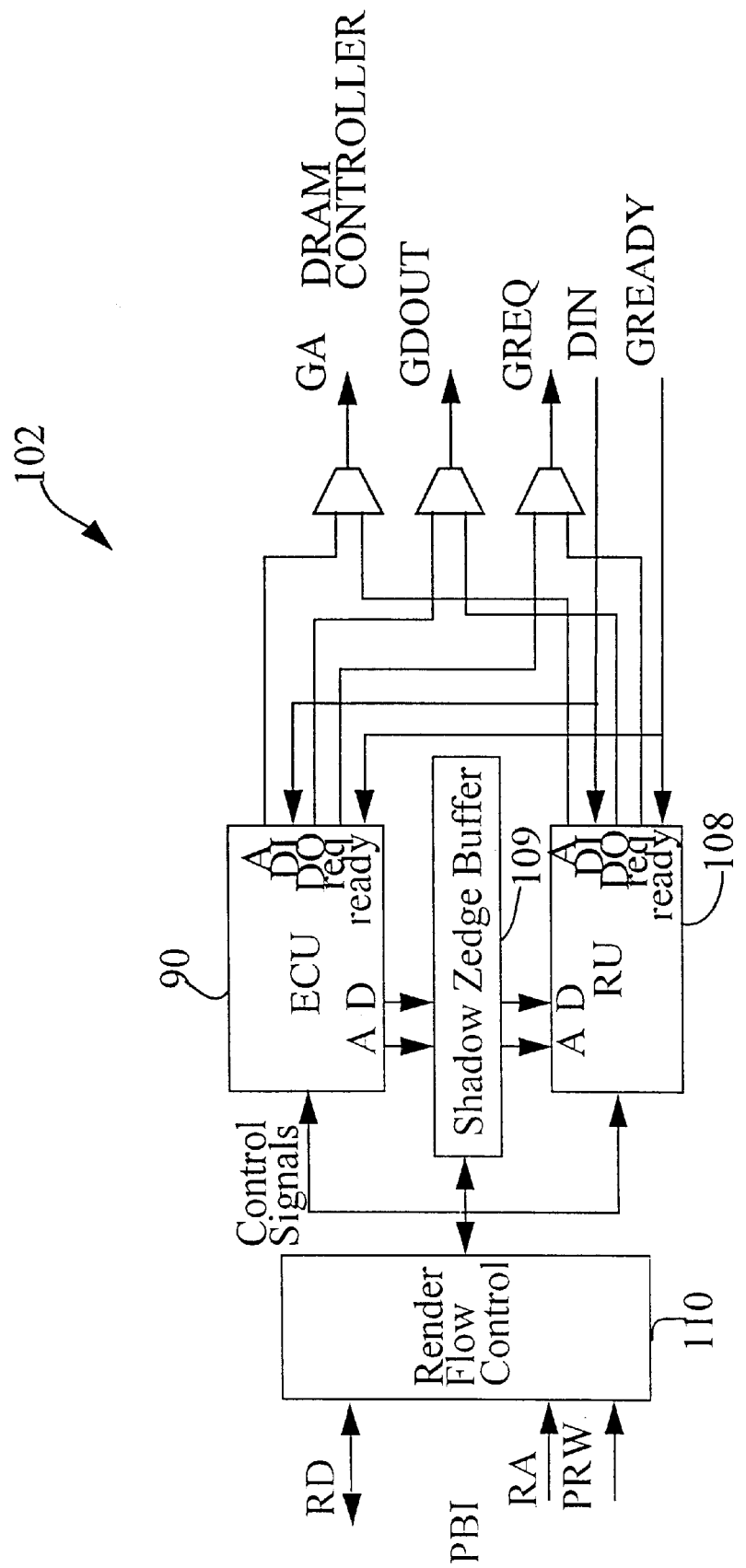
FIG. 19 is a schematic block diagram of the graphics engine module (GEM) of FIG. 18 in more detail.

Referring now to FIG. 19, there is shown the graphic engine module (GEM) 102 of FIG. 18 in more detail. The GEM 102 includes the edge calculation unit (ECU) 90 and a rendering unit (RU) 108. As will be further hereinafter described, the RU 108 comprises the VDU 92 and RLE 93 of FIG. 17. The ECU 90 and RU 108 alternate their operations in order to produce a band for printing. The GEM 102 utilizes the vector line intersection list, which was previously prepared by the CPU 87 (FIG. 16), to output a run length encoded bit map to the band buffer 94 (FIG. 17) which is stored in DRAM memory 86 (FIG. 16).

The GEM 102 is controlled by a render flow control unit (RFC) 110 which contains a number of registers which can be read to, and written from, the PBI 101. These registers and their widths (in bits) are as shown in the table below.

TABLE 2

GEM Unit register table

| Name | Width | Description |
|---|---|---|
| Control | 4 | Control register |
| Base0 | 22 | Base address register 0 |
| Base1 | 15 | Base address register 1 |
| MINLINE | 13 | Line where the GEM starts it activities |
| MAXLINE | 13 | Line where the GEM stops its activities |
| MAXPIXEL | 8 | Length of the Zedge buffer |
| LINE | 14 | Line counter. |
| RPIXEL | 8 | RU Pixel counter. |
| RMINPIXEL | 8 | First valid pixel in a line |
| RMAXPIXEL | 8 | Last valid pixel in a line |
| RECOLOR | 28 | Color used to recolor text detected |
| Traspmask0–3 | 32 | This is a group of 4 registers, each 32 bit wide. Each bit in a register determines whether a level is transparent or opaque. |
| Shadow0–152 | 153 | Shadow Zedge Buffer |

The registers Base0 and Base1 define the locations in DRAM 86 of critical working areas for the GEM 102. These registers are subdivided into various fields, each of which defines a start location of a particular storage area. The organisation of the Base0 and Base1 registers is shown in the following tables.

TABLE 3

The Base0 Register

| Bits | Name | Description |
|---|---|---|
| 0–9 | Zedge_base | Base address for Zedge buffer storage in DRAM |
| 10–15 | LS_base | Base address for Line Segment (LS) storage in DRAM |
| 16–21 | BBprep_base | Base address for Band Buffer during preparation |

TABLE 4

The Base1 Register

| Bits | Name | Description |
|---|---|---|
| 0–5 | BBrend_base | Base address for Band Buffer during printing |
| 6–14 | Prop_base | Base address for the Property Table |

As can be seen from the above tables the resolution of base addresses or memory storage areas is limited. For example, the Zedge_base address is 10 bits wide. The DRAM memory 86 can consist of a maximum of 1024 K words, with each word being 32 bits wide. This implies a 20 bit address. Therefore, the position of the Zedge_base address can only be determined with an accuracy of 10 bits (ie. in steps of 1024 32 bit words).

Table 5 below lists the various I/O signals into and out of the GEM 102.

TABLE 5

| Signal Name | I/O | Width | Connecting Module | Description |
|---|---|---|---|---|
| DIN | I | 32 | DRAM Controller | DRAM input data bus |

TABLE 5-continued

| Signal Name | I/O | Width | Connecting Module | Description |
| --- | --- | --- | --- | --- |
| GDOUT | O | 32 | DRAM Controller | DRAM output data bus |
| GA | O | 20 | DRAM Controller | DRAM address bus |
| REQ | O | 1 | DRAM Controller | DRAM bus request |
| WREQ | O | 1 | DRAM Controller | DRAM bus requested for writing |
| GREADY | I | 1 | DRAM Controller | Data from DRAM ready |
| RD | I/O | 32 | PBI | Bidirectional data bus for processor-registers interface |
| RA | I | 4 | PBI | Register address from PBI |
| PRW | I | 1 | PBI | R/W signal from PBI |

The edge calculation unit (ECU) 90 calculates the intersection of the currently active line segments with the current scan line of the current band. This is done by maintaining a currently active edge list which is initially empty and is updated as the scan line advances. Returning briefly to FIG. 15, for each new line, the ECU 90 appends those line segments which begin on the current line to the end of the currently active edge list. Subsequently the ECU 90 sequentially traverses the active edge list and, for each line segment in the list, the pixel and level information are stored in the Zedge buffer 91 via the DRAM control unit 104 (FIG. 18) and used, as will be described hereinafter, for later visibility determination. With some output devices, the paper may be slightly misplaced in position between the printing of bands. In this situation, paper slippage can be accommodated by offsetting the pixel field or origins of the pixel co-ordinates by the amount of slippage. If the currently active line is coincident with the end line field of the list element the line segment is deleted from the active edge list as it will terminate on the current line. Otherwise, the pixel field is updated according to the equation $$Pixel_{n+1} = Pixel_n + slope. \quad (EQ\ 17)$$

After all the edges of a given line have been calculated, the ECU 90 notifies the rendering unit 108, via a render flow control unit 110, that it may be proceed and the ECU 90 stops and waits for it to be again activated by the render flow control unit 110.

Figure 20:
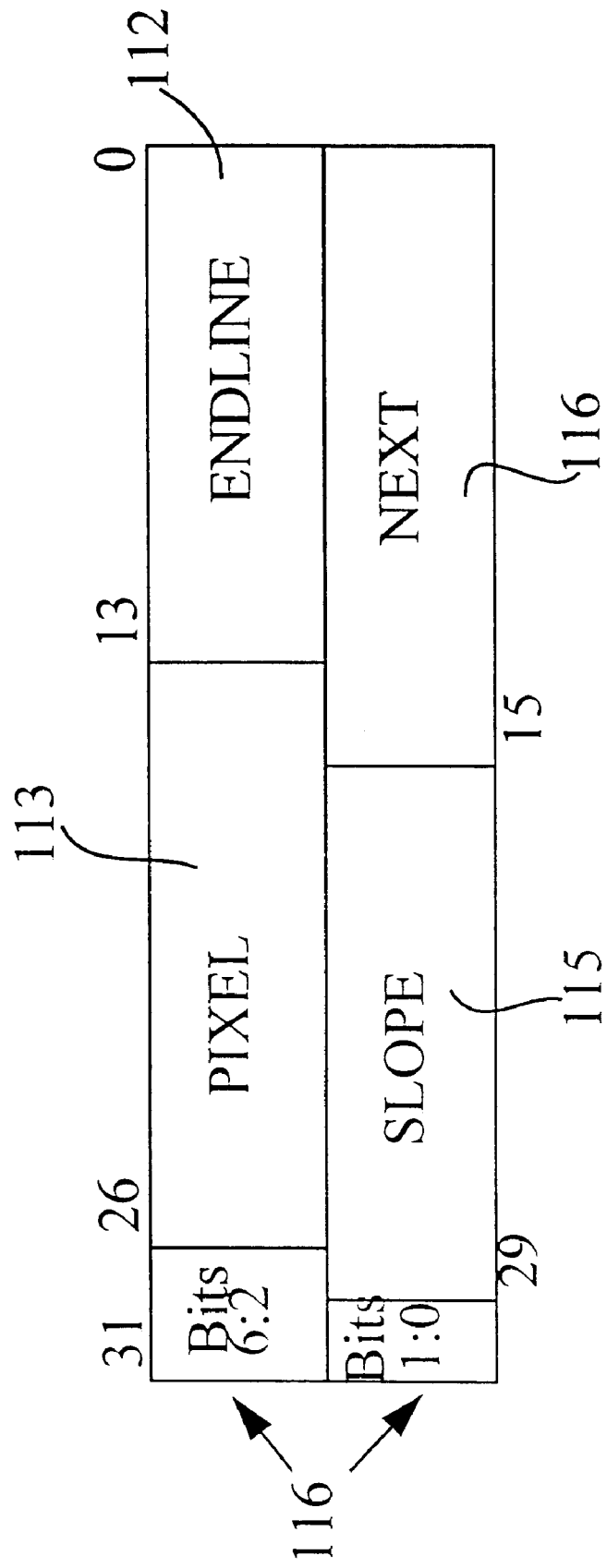
FIG. 20 illustrates the format of storing line segments in the preferred embodiment.

The vector line intersection list of FIG. 15 is stored in the DRAM memory 86 and is pointed to by the LS_base field in the base0 register. This area includes the array of pointers 82 to lists of list elements 83. Each pointer in the array is a 16 bit quantity. Turning now to FIG. 20, there is shown the format of each list element 83, which includes 13 bits designating the last line of pixels within a band in which the line segment is active 112, the currently active pixel on a line 113, the gradient of the line 115, a pointer to the next list element 116 and 7 bits (allowing 128 levels) of level information 117. As the end line value 112 is 13 bits wide, a band can be at most 8,192 lines long. Both the pixel field 113 and the slope field 115 are stored in two's complement fixed point notation with 5 bits for the fractional part. This allows for values between ±256, with 5 bits of precision after the decimal point. Therefore, the maximum error accumulated by adding the slope to the current value of the pixel for each line will always be less than one pixel if the line segment is shorter than 32 pixels long. If the line segment is longer than 32 pixels, the accumulated error can exceed one pixel. Of course, this would depend on the actual value of the slope field. The accumulated error can be reduced simply by breaking a line segment into a number of smaller line segments. The next field 116, being 16 bits wide, can accommodate up to 65,535 different line segments per band.

Figure 21:
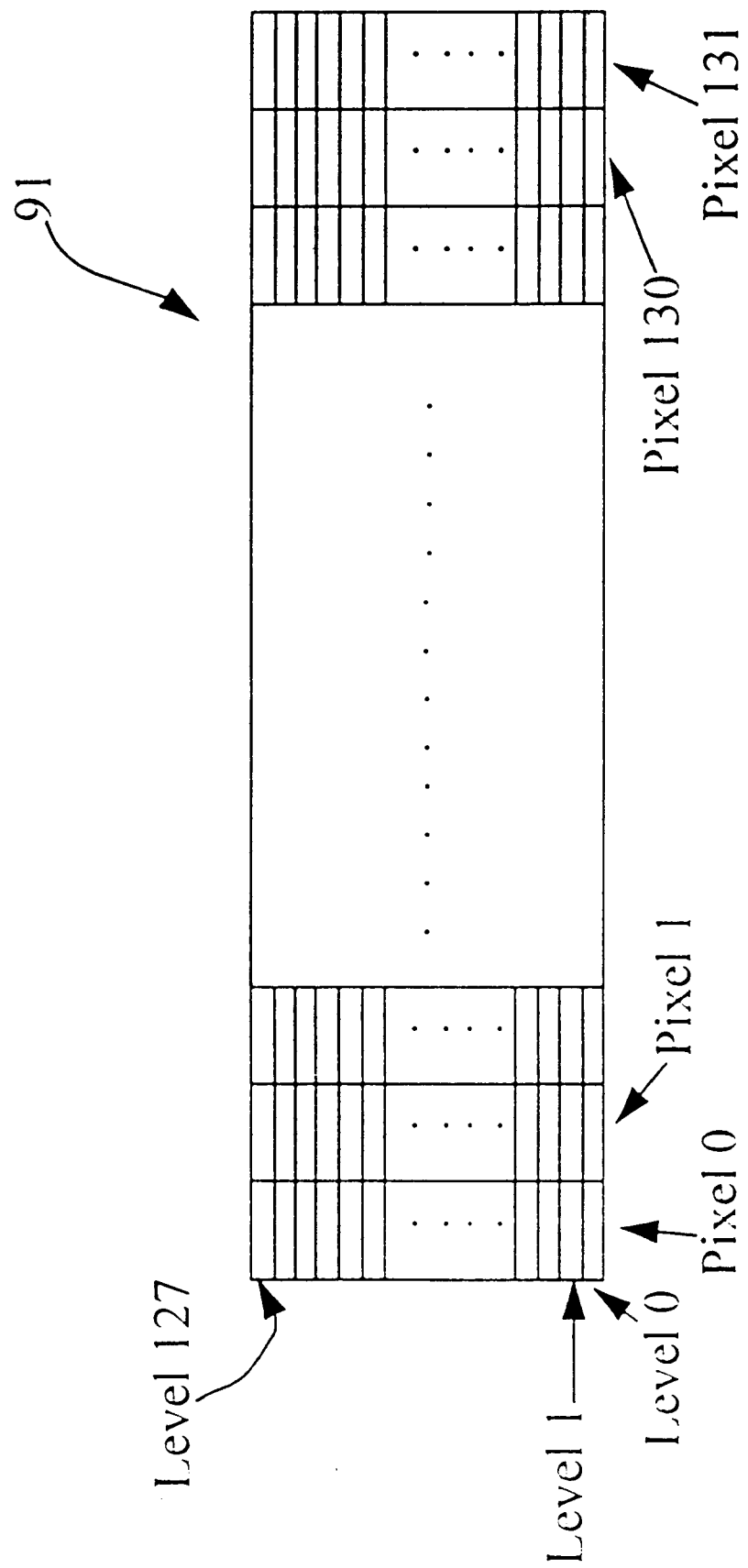
FIG. 21 illustrates the Zedge buffer structure of the preferred embodiment.

For each active line segment on a current line, the current pixel locations and object level information is stored in the Zedge buffer 91 in the DRAM memory 86. Referring now to FIG. 21, there is shown an example of the Zedge buffer 91. Assuming, that there are 132 pixels in a line within a band and up to 128 possible levels that can be rendered on each pass, the Zedge buffer 91 consists of a 1-dimensional array of pixel records having 132 elements, with each pixel record in turn having 128 bits, one for each possible level. The ECU 90 stores a single bit in memory for the pixel coordinate and level information for each active edge in the active edge list.

The need to store the Zedge buffer 91 in DRAM memory 86 represents an overhead to the system similar to that facing microprocessor designers who are required to implement caching schemes. It is often the case that DRAM memory 86 is substantially slower than the rest of the logic making up the band rendering subsystem 88. The level information of each pixel of the Zedge buffer 91 comprises a 128 bit record. Therefore, each pixel record can be stored in the DRAM memory 86 as four consecutive 32 bit words. In order to increase the performance of the band rendering subsystem, a shadow Zedge buffer 109 (FIG. 19) is provided to give a summary of the status of the DRAM memory 86 without requiring the band rendering subsystem to access it.

Figure 22:
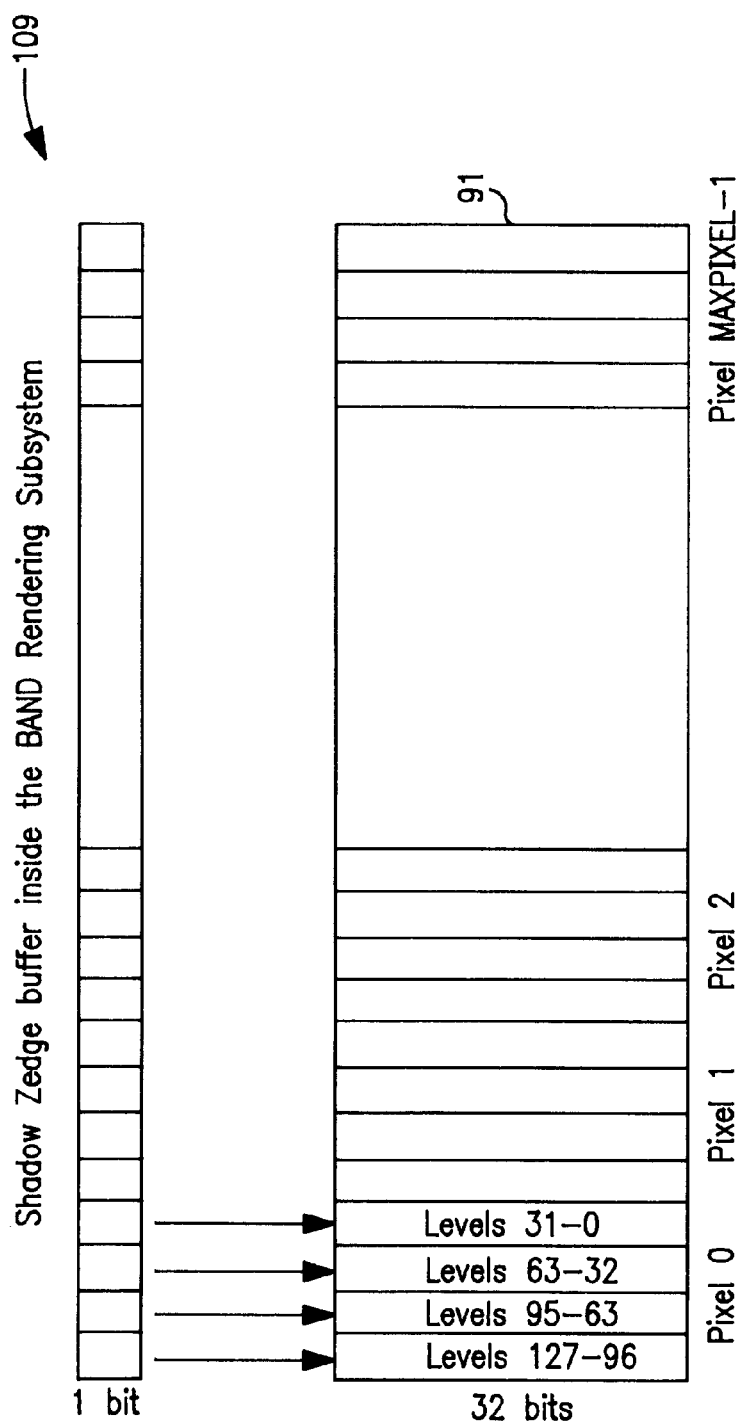
FIG. 22 illustrates the shadow Zedge buffer of the preferred embodiment.

Referring now to FIG. 22, there will now be explained the operation of the shadow Zedge buffer 109 and the Zedge buffer 91 respectively. Each pixel occupies b 128bits in the Zedge buffer memory 91. The shadow Zedge buffer 109 stores 4 bits of information per pixel, with 1 bit for each external word stored in the Zedge buffer 91. At the start of each line the shadow Zedge buffer 109 is cleared and, when an edge is written to the Zedge buffer 91, its corresponding location bit in shadow Zedge buffer 109 is set. Therefore, during the edge storage phase, if a word has already been modified, then a full read modify write cycle will be necessary to DRAM memory 86. However, if the location for a current edge has not been set in the shadow Zedge buffer 109 then only a write to memory is required. As will be further discussed below, during the rendering phase, the contents of each location of the Zedge buffer 91 should, in theory, be read and cleared. However, if the corresponding location in the shadow Zedge buffer 109 is not set then no memory reads are required. Since it is likely that for simple images, most of the pixels will not contain any edges, looking at the shadow Zedge buffer 109 rather than reading from DRAM memory 86, represents a substantial saving in terms of DRAM bandwidth and time.

Referring again to FIG. 19, after all the edges for the current line have been processed by the ECU 90, the render flow control unit 110 notifies the render unit (RU) 108 to begin operation.

Figure 23:
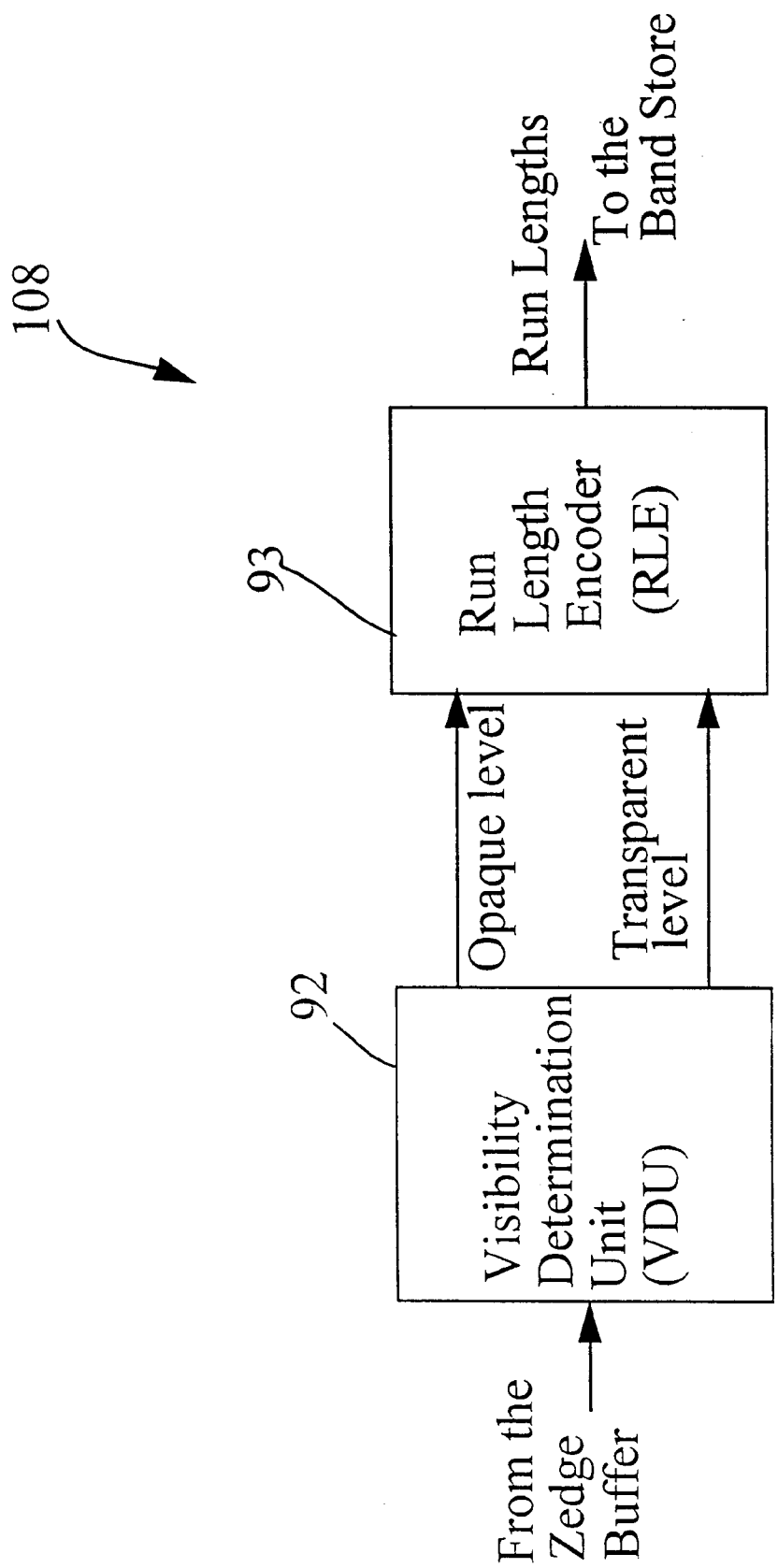
FIG. 23 illustrates the rendering unit of FIG. 19 in more detail.

Referring now to FIG. 23 there is shown the rendering unit (RU) 108 of FIG. 19 in more detail. The rendering unit 108 consists of the visibility determination unit (VDU) 92 and the run length encoder (RLE) 93. The VDU 92 reads edges from the Zedge buffer 91 and/or the shadow Zedge buffer 109 and uses the edges to determine the highest visible level and whether any transparent level object is above the highest visible level. This process is repeated for each pixel and the run length encoder 93 subsequently stores an encoded run length in the band buffer 94.

In order to reduce the memory bandwidth requirements, the VDU 92 relies extensively on the shadow Zedge buffer 109. As mentioned previously, in theory, it would be necessary to fetch four 32 bit words from the Zedge buffer 91 in DRAM 86 for each pixel and to clear such memory after it has been loaded so that the ECU 90 will work correctly for the next line. The memory band width requirement can be greatly reduced by the use of the shadow Zedge buffer 109. By looking at the 4 bit summary of each pixel, it is necessary to only load those pixels that will effect the result. If a bit is set in the shadow Zedge buffer 109, then the corresponding word needs to be loaded from the Zedge buffer 91. Where the bit is unset no memory read is necessary. Another substantial bandwidth advantage is in clearing each pixel after it has been read. By using the shadow Zedge buffer 109, it is only necessary to clear the pixel in the shadow Zedge buffer leaving the data in the DRAM memory untouched. Again no memory read from memory 86 is required.

Figure 24:
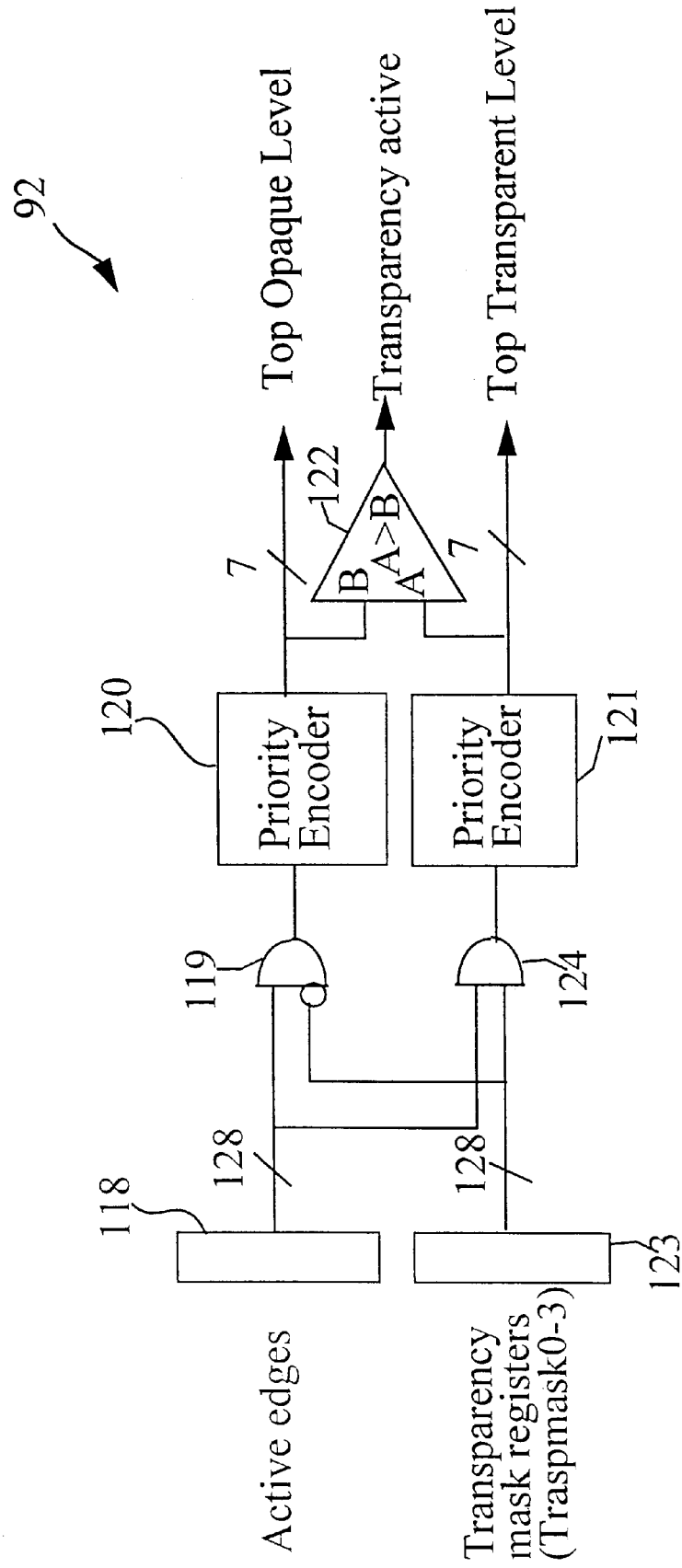
FIG. 24 is a schematic block diagram of the visibility determination unit (VDU) of FIG. 19.

Referring now to FIG. 24, the operation of the visibility determination unit is similar to that described in Australian Patent Application No. 38242/93, lodged Apr. 28, 1993, entitled "Method and Apparatus for Providing Transparency in an Object Based Rasterised Image" filed by the present applicant and corresponding to U.S. Pat. No. 5,428,724, the contents of which are incorporated by cross reference. The active pixel edge data for each pixel is read from the Zedge buffer 91 where necessary, and formed into 128 bit words for each pixel. These words are then used to toggle a set of toggle latches 118. The output of the toggle latches is fed via AND gate 119 to a priority encoder 120. The priority encoder determines the highest currently active level of its 128 inputs, outputting the value of the highest active level which will be the top opaque level that is currently active.

Figure 25:
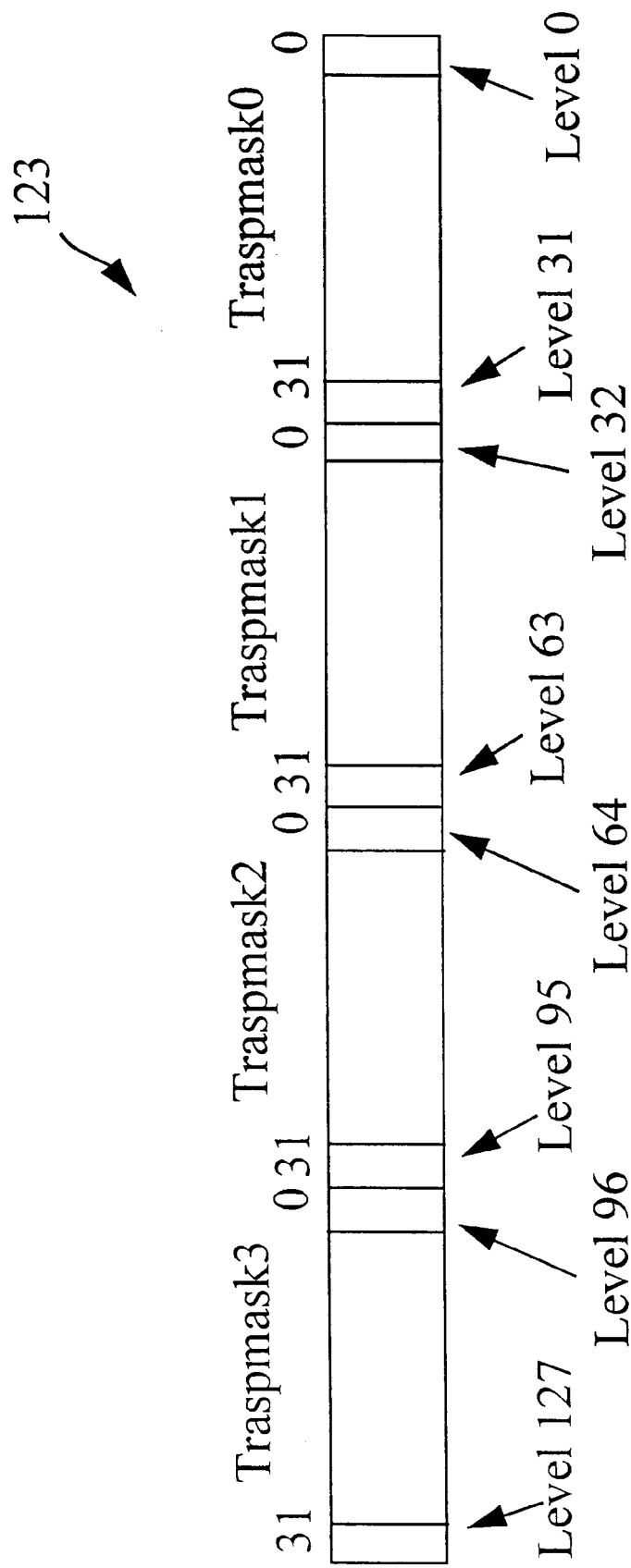
FIG. 25 illustrates the transparency mask register structure used in the preferred embodiment.

As disclosed in Table 2, the GEM unit 102 includes a series of four 32 bit transparency mask registers 123. These registers are loaded by the CPU 87 during the page preparation process and include a bit for each level signifying whether objects on that level are transparent or not. The four transparency mask registers 123 are concatenated together as shown in FIG. 25 to provide an indication of which of the 128 levels are transparent.

Referring again to FIG. 24, the 128 values stored in the transparency mask registers 123 are used to gate the incoming opaque levels via the gate 119. Therefore, active levels will only pass through the gate 119 and reach the priority encoder 120 when both the toggle latch 118 for that level has been toggled an odd number of times and the corresponding transparency mask value for that level has not been set.

Similarly, gate 124 ensures that the only active levels which reach priority encoder 121 are those whose active edges have been toggled an odd number of times in addition to having the levels transparency values set in register 123. Priority encoder 121 therefore determines the maximum currently active transparency, outputting this value as the top transparency level. After both the top opaque and transparent levels have been determined, a comparator 122 compares the top opaque level with the top transparent level and outputs a transparency active signal when the transparent level is greater than the opaque level.

Referring again to FIG. 23, the output from the VDU 92, being the highest opaque and transparent levels, is forwarded to the run length encoder (RLE) 93.

Figure 26:
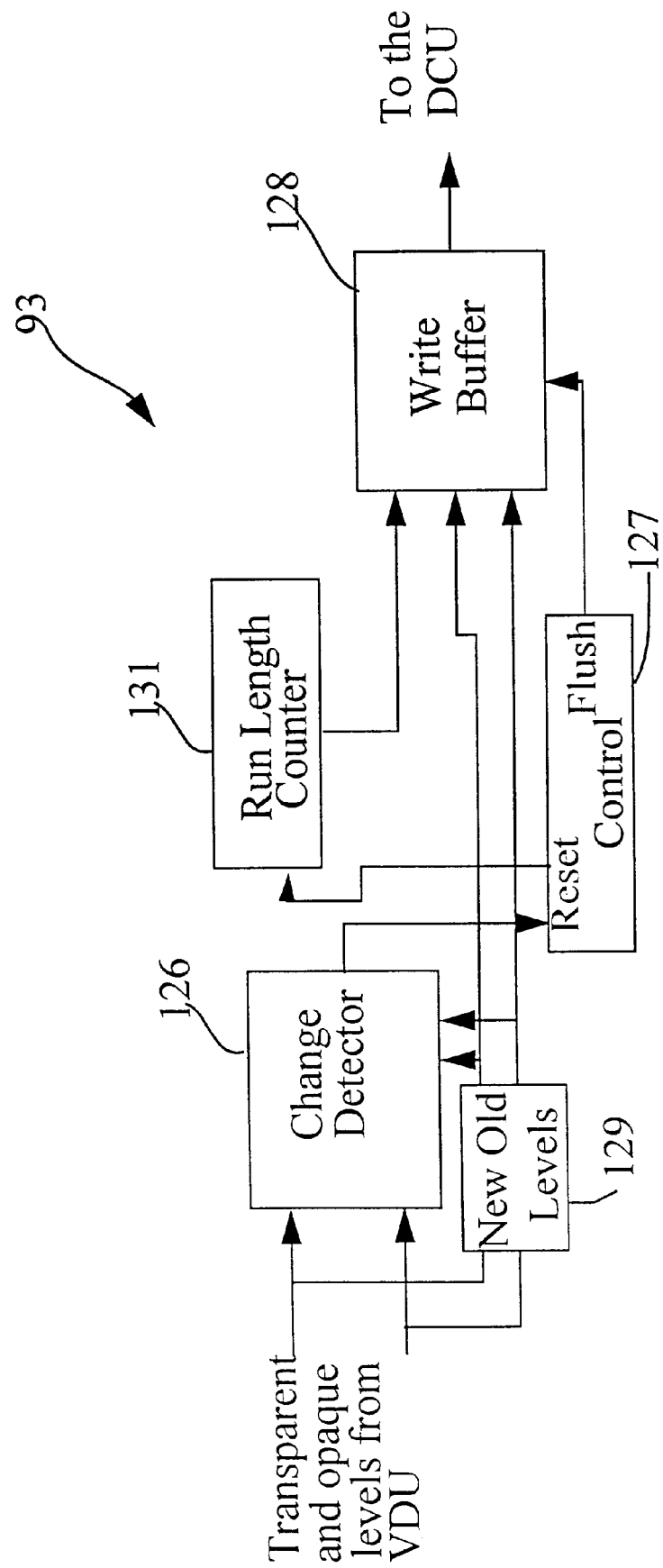
FIG. 26 is a schematic block diagram of the run length encoder of the rendering unit of FIG. 23.

Referring now to FIG. 26 there is shown the RLE 93 in more detail. The RLE receives pixel by pixel data from the VDU and transforms it into run length data. It has been found in practice, that for most images, the top object changes fairly rarely, with the changes, in most cases, occurring greater than 10 pixels apart. Therefore, run length encoding is utilized to compact the data to be stored in the band buffer 94. The VDU 92 passes pixel data to the RLE 93 for each pixel on a line. A change detector unit 126 notifies a control unit 127 when the input values from the VDU 92 change. When a change is detected, the old level is updated with the new value 129 and the previous levels are written to write buffer 128 with a run length counter value 131 which indicates how many pixels the previous object was the top level object. The run length counter 131 is then reset and subsequently incremented for each incoming pixel for which no change is detected. Once the write buffer 128 has been filled with a predetermined number of run length encoded entries, it is written to the band buffer 94 in DRAM memory 86 through the DRAM control unit (DCU) 104. When this flushing of the write buffer 128 occurs, the VDU 92 is stalled. The write buffer 128 is used so that writing to DRAM occurs in blocks and the DRAM's fast page mode can be utilized.

Figure 27:
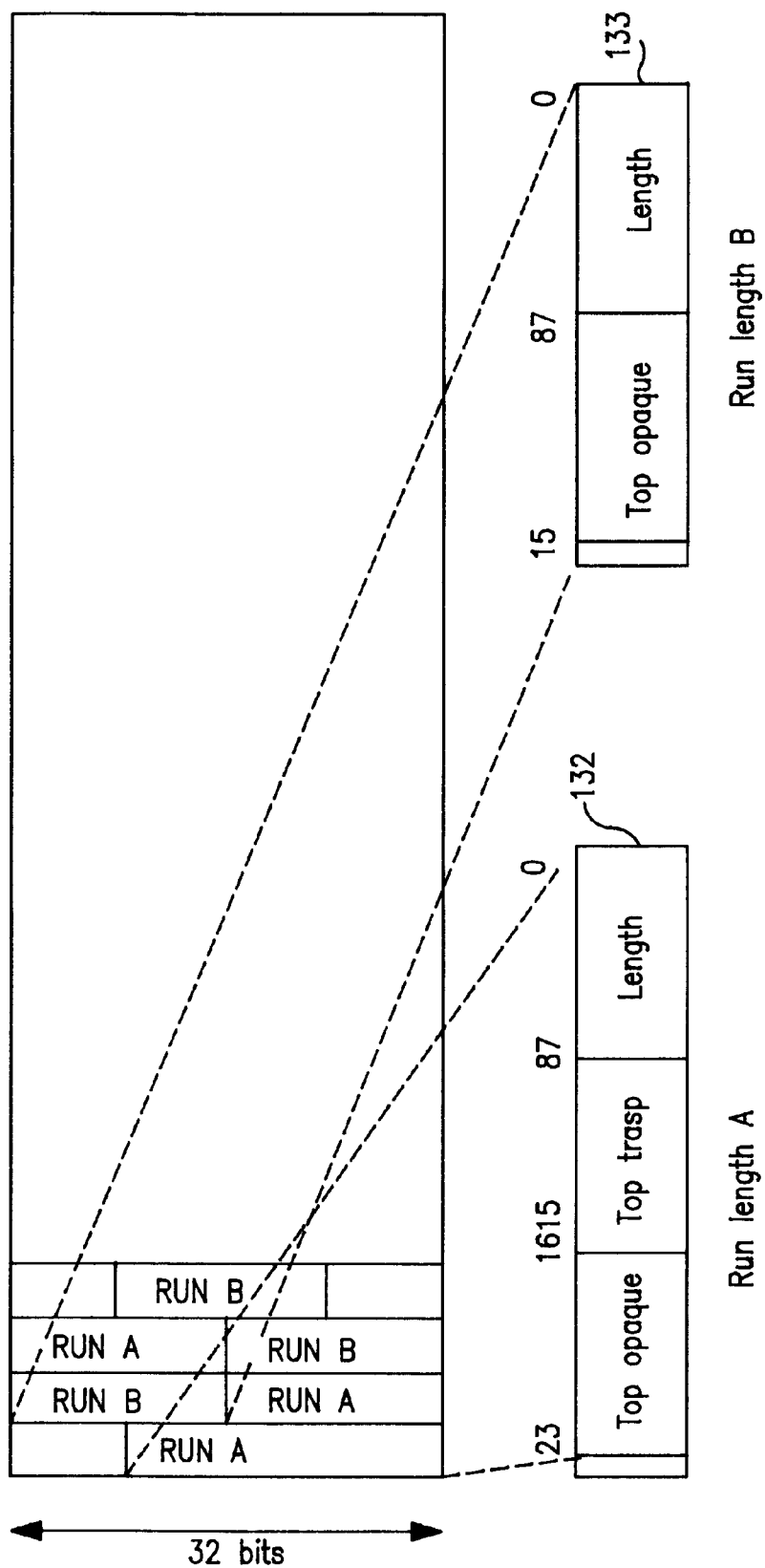
FIG. 27 illustrates the run length encoder data structure utilized in the preferred embodiment.

Referring now to FIG. 27, there is shown the structure of the band buffer 94 and corresponding run length encoding data structures. The run lengths are sequentially stored in the band buffer 94 without any formal separators for new lines. Therefore, in order to extract the run length belonging to a particular line, all the run lengths up and to that line are required to be scanned. Of course, this will not be a problem during printing of the band as this is an inherently sequential process anyway. The run lengths are only produced by run length encoder 93 for pixel coordinates between the values stored in the registers RMINPIXEL and RMAXPIXEL. This allows the image to be broken into bands of a size as required by the output device. Also, if necessary, better performance can be obtained by using the two registers as the next band can be processed by the GEM unit 102 while the current band is being printed. Additionally, the band size can be adjusted where necessary, for example, at the end of each page.

As shown in FIG. 27, there are two types of run lengths available. A first "A" type 132 is utilized when both transparent and opaque levels are active. This A type 132 comprises 24 bits of memory storage with the highest order bit signifying that it is of an A type. Similarly B type run lengths 133 are those that have an opaque active top level. The use of two types of run lengths is designed to further reduce memory storage requirements.

Referring again to FIGS. 17 and 18, once the GEM 102 has completed the process of creating run lengths for the whole of a single band, the ink jet module 103 is activated to produce the final pixel band for the printer. The ink jet module 103 is responsible for expanding the run lengths and creating the required blends for each line before compositing those blends with incoming scanned data and sending the final pixels to the printer.

Figure 28:
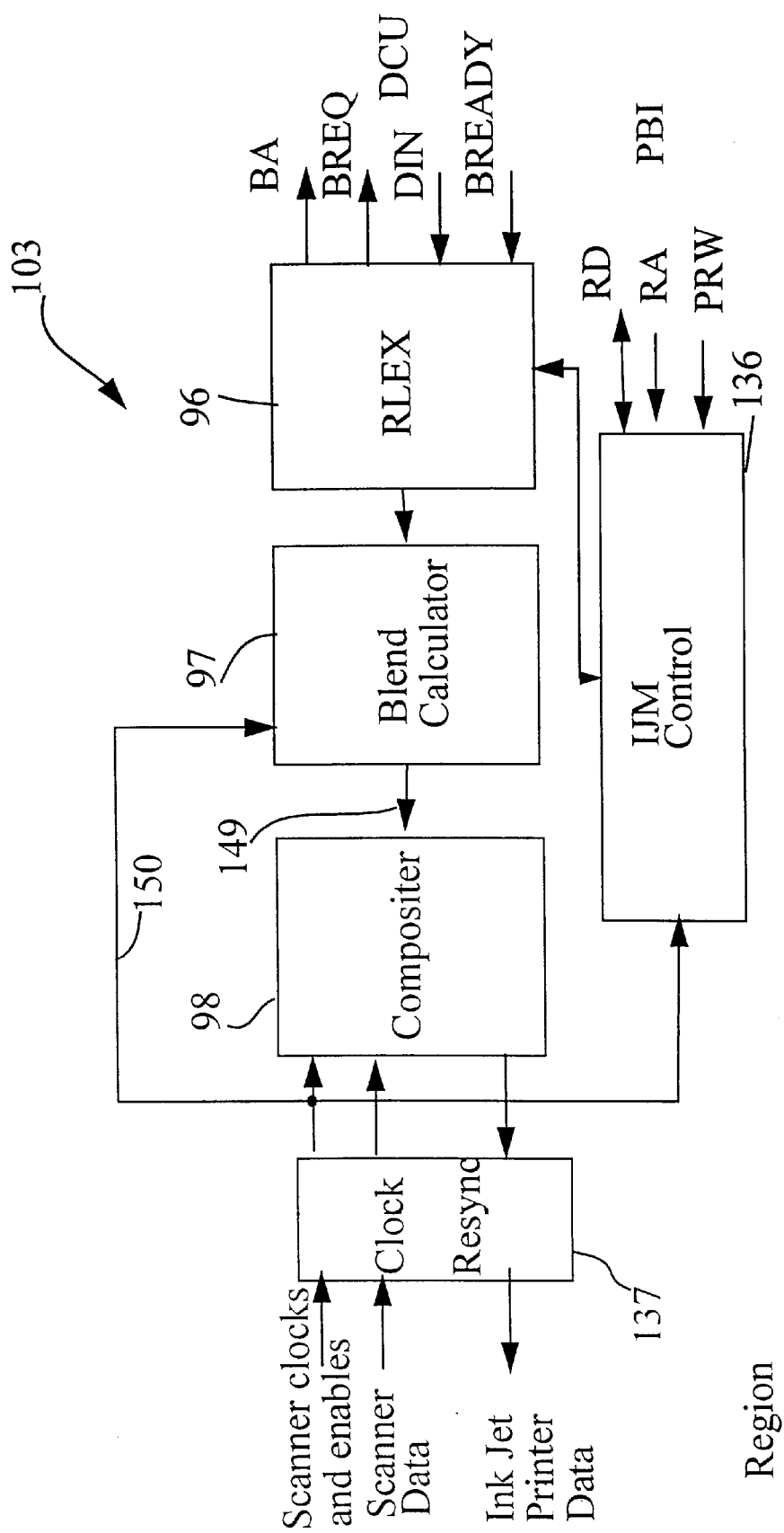
FIG. 28 is a schematic block diagram of the ink jet module of FIG. 18.

Referring now to FIG. 28 there is shown the ink jet module (IJM) 103 in more detail. The ink jet module includes a run length expander 96, blend calculator 97, compositor 98, ink jet module control unit 136 and clock synchronisation unit 137. Table 6 below shows the various input/output signals for the ink jet module 103.

TABLE 6

| Signal Name | I/O | Width | Connecting Module | Description |
| --- | --- | --- | --- | --- |
| DIN | I | 32 | DRAM Controller | DRAM input data bus |
| BDOUT | O | 32 | DRAM Controller | DRAM output data bus |
| BA | O | 20 | DRAM Controller | DRAM address bus |

TABLE 6-continued

| Signal Name | I/O | Width | Connecting Module | Description |
|---|---|---|---|---|
| REQ | O | 1 | DRAM Controller | DRAM bus request |
| WREQ | O | 1 | DRAM Controller | DRAM bus requested for writing |
| BREADY | I | 1 | DRAM Controller | Data from DRAM ready |
| RD | I/O | 32 | PBI | Bidirectional data bus for the processor-registers interface |
| RA | I | 4 | PBI | Register address from PBI |
| PRW | I | 1 | PBI | R/W signal from PBI |
| 4VCLK | I | 1 | IJ copier | Ink jet clock |
| VCLK | I | 1 | IJ copier | Ink jet clock |
| BVE | I | 1 | IJ copier | Ink jet band enable |
| VI | I | 1 | IJ copier | Ink jet line enable |
|  | I | 8 | IJ copier | Ink jet scanner port |
|  | O | 8 | IJ copier | Ink jet printer port |

The run length expander 96 loads run lengths from the run length band buffer 94 stored in DRAM memory 86 in addition to associated color information from property table 95 (FIG. 17) also stored in DRAM memory 86. This information is expanded and forwarded to the blend calculator 97 that works on a pixel by pixel basis. The property table 95 (FIG. 17) contains all the information that, once extracted by the RLEX 96, can be used by the blend calculator 97 and compositor 98 to produce a bit map to be sent to the printer. The property table 95 is created as part of the page preparation process and has 128 entries, with one entry for each level. Referring now to FIG. 29 and FIG. 30 there is shown the opaque level entry 141 and the transparent level entry 142 for an object in the property table 95. Each entry occupies four 32 bit words in DRAM memory 86. Thus, the property table is completely contained in a DRAM page and fast page mode memory read techniques can be used to rapidly transfer it to the run length expander 96. The position in DRAM memory 86 of the page table is determined by a Ptable_base field in the base register. The contents of a levels entry is interpreted differently depending on whether the level is opaque or transparent. The opacity or transparency of a level is determined by the levels setting in the corresponding transparency mask register of FIG. 24. The various fields of the property table entry will be discussed further below with reference to the discussion of the blend calculator 97.

Figure 31:
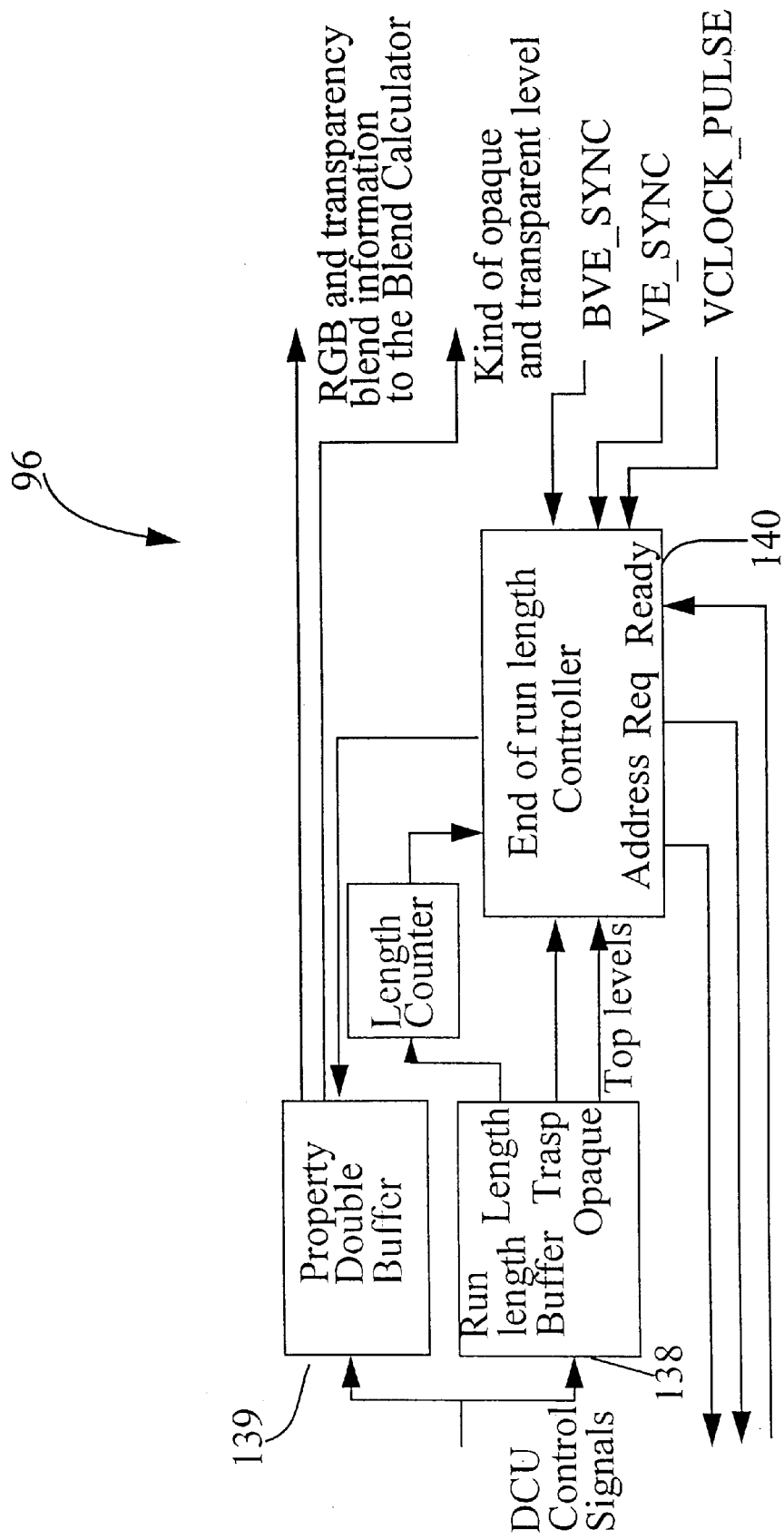
FIG. 31 is a schematic block diagram of the run length expander unit of FIG. 28.

Referring now to FIG. 31 there is shown the run length expander 96 in more detail. The run lengths and color information are loaded from the DRAM memory 86 via the DRAM controller unit 104 into respective double buffers 138 and 139. The use of double buffers eases the memory bandwidth requirements by clustering accesses to the DRAM memory 86 allowing the use of fast page mode memory access. Furthermore, the use of double buffers allows one set of data to be loaded while another set is in use.

Once the graphics engine module 102 has completed its operations it notifies the processor bus interface 101 which sets the IJMGO bit in the control register (see Table 1), which starts the operation of the run length expander 93. The run length expander 93 begins by loading the run length buffer 138 under the direction of the controller 140. The length, transparency and opacity levels are decoded by controller 140 which forwards the relevant property information for that transparency and opacity level from the double buffer 139 to the blend calculator 97 (FIG. 28). Pixel data within the band rendering system 88 is stored in Red, Green, Blue (RGB) format with 8 bits for each primary color component and a further 8 bit transparency or opacity mask. There are a maximum of 128 levels in a particular page layout, each of which can be either transparent or opaque. A transparent level is defined by a single base 24 bit RGB color or by data coming from the scanner 1 (FIG. 1), in addition to transparency data which can vary according to a linear blend in any direction or by modulation by data coming from the scanner. An opaque level entry comprises a color blend in any direction or data taken from the scanner. As mentioned previously, only the top level transparent and top level opaque data for each pixel is forwarded by the GEM 102, with the transparency level only being considered if it is greater than its corresponding opaque level. The above combinations of transparency and opacity levels allows for great versatility in the possible output, a few examples of which will be outlined in the following numbered paragraphs.

1. By allowing the opacity level to be the color data coming from the scanner, real world scanned images can be used to "texture map" any of the objects making up the page layout.
2. The opaque level of an object can also be texture mapped with a recolored black and white image, for example text, which has been input by the user on the copier/scanner 1. As will be further be described hereinafter, the blend calculator 97 allows all the white parts of a scanned image to be recolored with a predefined constant color and all the black parts to also be recolored with a color blend defined as part of the opacity level. Additionally, the roles of white and black can be swapped. The determination of whether a particular color is white or black is defined through a comparison with a threshold value. As such effects can be defined on a level by level basis, it is possible to have one part of the page layout texture mapped with images and a second part recolored with the black and white image coming from the scanner.
3. On top of any opaque level there can be defined a transparency level containing a blend tending towards any RGB color. Additionally, it is possible to define the basic color of the transparent level to be scanner data and simultaneously have its transparency vary with a linear blend. With this set up, the data from the scanner will be gradually superimposed over any underlaying graphical objects. This allows for the possibility for scanned images to smoothly mix and fade into graphical objects of a page layout.
4. Controlling the transparency of a level with scanned image data allows for many useful effects. For example, it is possible to modulate the transparency of the level gradually, according to the luminosity component of the scanned image data, which gives an effect of viewing a scanned image through stained glass.

Where a transparent level lies over an opaque level the pixel values for the two levels must be combined or composited in certain ways. Equation 18 below shows how to derive a final color, color(x,y), from a transparent level color component $C_2(x,y)$, an opaque level color $C_1(x,y)$ and a transparency fraction $k(x,y)$ which takes a value between 0 and 1, with 0 being equivalent to total transparency and 1 being equivalent to total opacity. The compositing equation, utilized for each primary color RGB, is as follows:

$$\text{color}(x,y) = C_2(x,y)k(x,y) + C_1(x,y)(1-k(x,y)) \quad \text{(EQ 18)}$$

The opacity level color component ($C_1(x,y)$) can comprise a blend for each primary color component with the blend or color value being defined in Equation 19:

$$\text{Blend Value} = Ax + By + C \quad (EQ\ 19)$$

where A, B and C are predetermined constants derived from the requisite color blend.

In the present embodiment, A and B are assigned 15 bit fixed point numbers with 5 bits after the decimal point and C is an 8 bit number whose value is always positive. By utilizing separate values of A, B and C for each primary color component, an arbitrary linear blend in any direction may be defined.

With respect to the transparency level, $k(x,y)$ controls the amount of transparency in the image, with the value $C_2(x,y)$, define the transparency color level. As mentioned previously, the transparency component $k(x,y)$ can be derived from scanner data or can be a linear function of the current pixel position $(x,y)$. In the latter case the transparency amount is defined by the equation:

$$\text{Transparency} = Dx + Ey + F \quad (EQ\ 20)$$

In the present embodiment the values D and E are assigned 15 bit fixed point numbers with 5 bits after the decimal place. F is an 8 bit number whose value is always positive. These values are sufficient to define a linear transparency blend in any direction.

As outlined previously, the blend calculator 97 also has the ability to recolor scanner data that contains high contrasting color components to be altered to be other colors. This allows there to be superimposed, on any particularly created computer artwork, recolored text or patterns derived from the scanner device 1.

Returning now to FIGS. 29 and 30, there is shown the opaque level entry 141 and transparent level entry 142 making up the property table 95. With reference to the opaque level entry 141, blend values for A, B and C are defined for each of the primary color components red, green and blue, thereby defining an arbitrary blend plane in three dimensions. Additionally, a Kind Field is provided for the implementation of various texture mapping options for the opaque level as previously discussed. The value of the Kind Field of opaque level entry 141 and corresponding effects are defined as follows:

00—The opaque blend value is as defined by the A, B, C coefficients.

01—Color data for this level comes from the scanning device 1.

10—Any black text in the scanned image is detected and recolored with a blend defined by the A, B, C, coefficients. Non black portions are to be recolored with the contents of the Recolor register.

11—As for the detection of black pixels, but applied to white pixels rather than black pixels.

With reference to FIG. 30, the transparency level entry 142 includes values D, E and F as previously defined in addition to base color value components for each of the RGB pixel components. The transparency level also implements various options as defined by the KB and KT bits. If the KB bit is set, then the base color is taken from the property table, otherwise the color value is taken from the scanner. If the KT bit is set, then the amount of transparency is defined by the values D, E and F, otherwise the transparency value is derived from the luminance component of the incoming scanner data.

Figure 32:
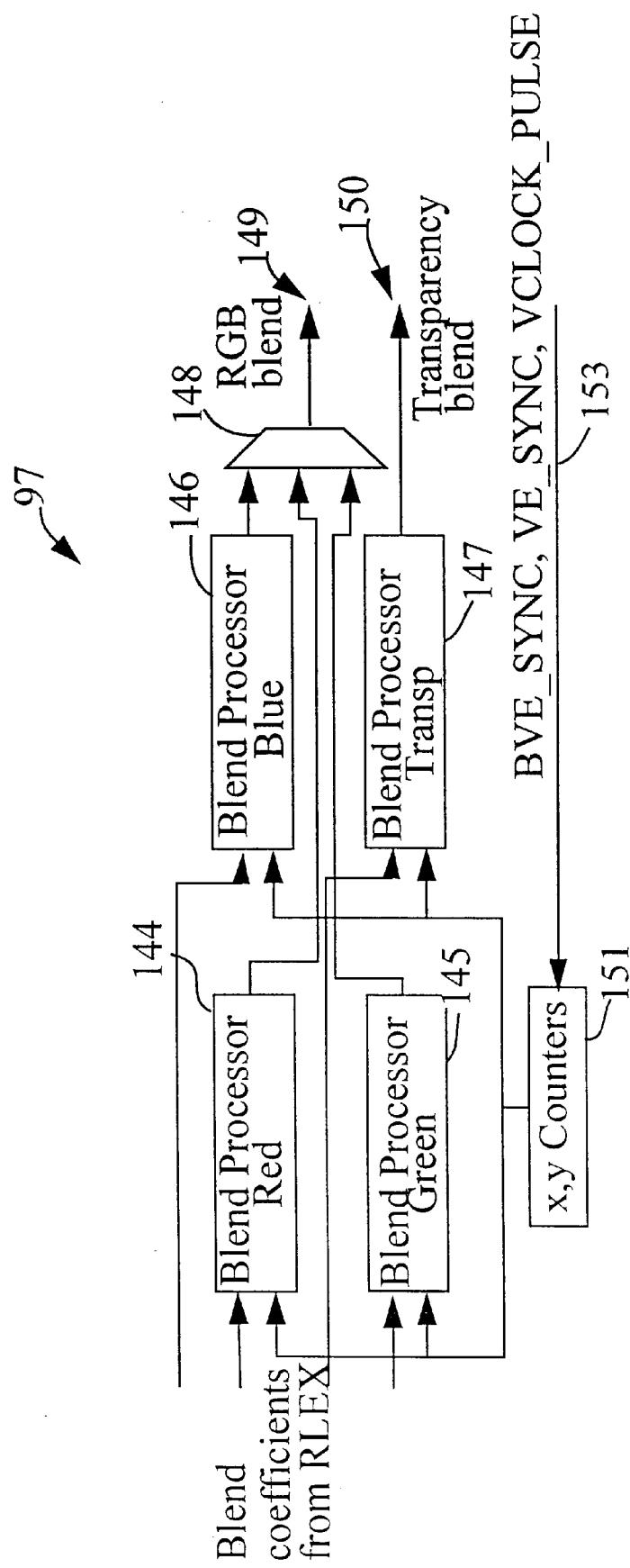
FIG. 32 is a schematic block diagram of the blend calculator of FIG. 28.

Referring now to FIG. 32, there is shown the blend calculator 97. The blend calculator 97 implements the blend calculations of Equation 19 and Equation 20 and includes separate blend processor units for processing Red 144, Green 145, Blue 146 and transparency data 147, to produce RGB output pixel data 149 and transparency blend data 150. The current x and y positions are provided by x,y counters 151. The input to the counters 151 include pixel clocking information and line clocking information 153 derived from the printing device 4. Although the actual pixel clocking data may differ with different brands of ink jet printers, it is assumed that a VCLOCK_PULSE signal is activated when the printer requires a new pixel. This signal in turn will increment the x counter to output the next pixel location. Similarly, each time the printer starts the new line in a current band the line counter is incremented by a VE_SYNC signal from the printing device and the x counter is simultaneously reset to its relevant offset value. Additionally, both the x and y counters are reset when a new page starts, which occurs on a BVE_SYNC signal from the printer.

Figure 33:
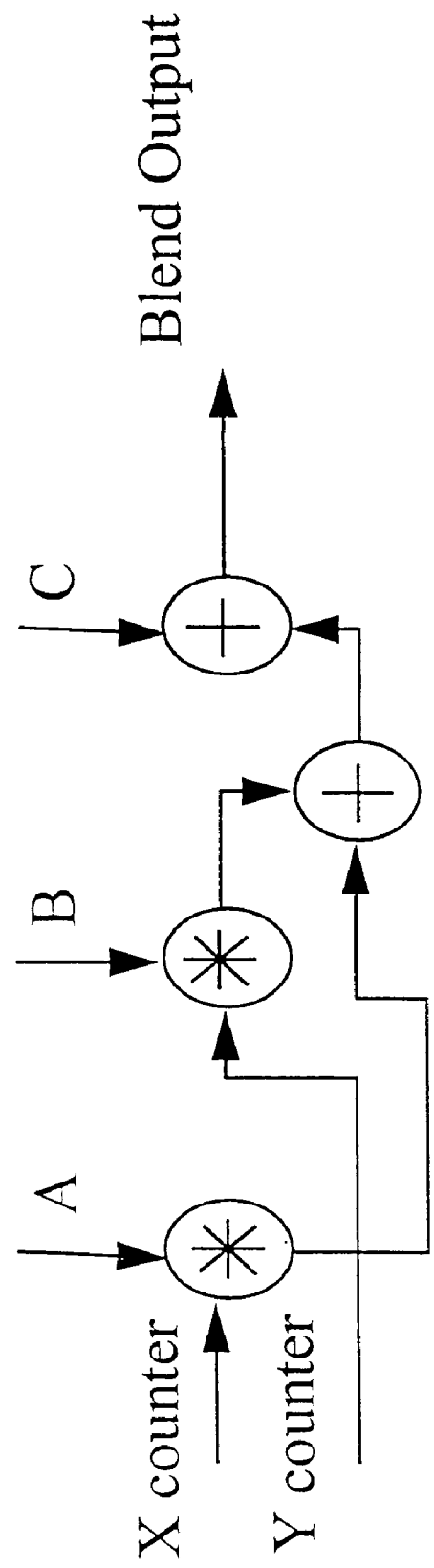
FIG. 33 is a schematic block diagram of the blend processor of FIG. 32.

Referring now to FIG. 33, there is shown a blend processor 155 (144–146 of FIG. 32) in more detail. The blend processor 155 implements Equation 19 with the x value being multiplied by A, the y value by B with the two values being added together and then added to C. The transparency blend processor 147 of FIG. 32 works in an equivalent manner but for the altered inputs D, E, F. As seen in FIG. 28, the output of the blend calculator 149, 150 is forwarded to the compositor 98. Further, in FIG. 32, the RGB output 149 from blend processor 97 is sequential in its RGB components. The particular color output is controlled by multiplexer 148 whose inputs are the required RGB blends.

Figure 34:
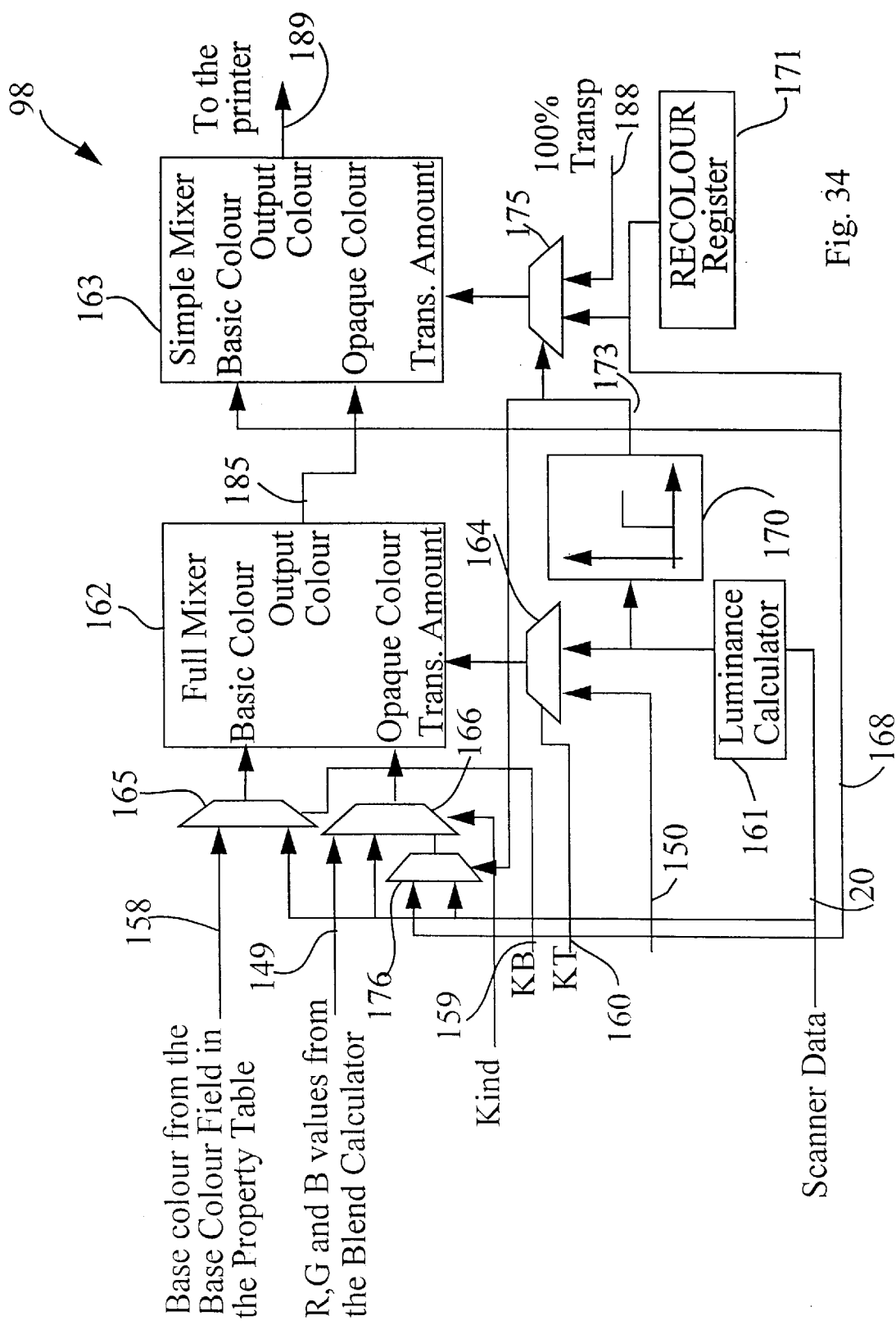
FIG. 34 is a schematic block diagram of the compositor of FIG. 28.

Referring now to FIG. 34, there is shown the compositor 98 in more detail. The inputs to the compositor 98 include the base color 158 from the property table, the RGB values 149 from the blend calculator 97, the KB and KT bits 159, 160 from the property table 95, the transparency factor 150 from the blend calculator 97 in addition to scanner data 20 from the scanner 1. The compositor 98 includes a full mixer 162 and a simple mixer 163. The full mixer 162 is responsible for implementing Equation 18, with the transparency amount $k(x,y)$ of Equation 18 being determined by the multiplexer 164, under the control of the KT signal, to be one of the transparency amount 150 calculated by the blend calculator or the derived luminance component from the scanner data 20, derived via luminance calculator 161. The luminance calculator 161 derives and approximation to the luminance value of the scanner data, with the standard luminance equation being:

$$\text{Luminance} = 0.30R + 0.59G + 0.11B \quad (EQ\ 21)$$

Alternatively, as the green component of the scanner data 20 contains almost two-thirds of the luminance of the signal, if necessary, the luminance calculator 161 can be eliminated, with its output being replaced by the green component of the scanner data 20.

The base color $C_2(x,y)$ of Equation 18 is determined by multiplexer 165 under the control of the KB signal 159, and is selected from the scanner data input 20 or the base color input 158.

The opaque color $C1(x,y)$ of Equation 18 is determined by multiplexer 166 under the control of the Kind field of the opaque level of the current object's property table entry to be one of the calculated blend value 149, scanner data 20 or a recolor register data value 168.

A recolor detection unit 170 thresholds the scanner input data 20 to determine if the pixel input data has a value at one of the extremes of input so as to require replacement by color data stored in the recolor register 171. The output signal 173 from recolor detection unit 170 is used to control multiplexers 175, 176 and to thereby replace the scanner input data 20 with recolor register data 171 when an extreme is detected.

Figure 35:
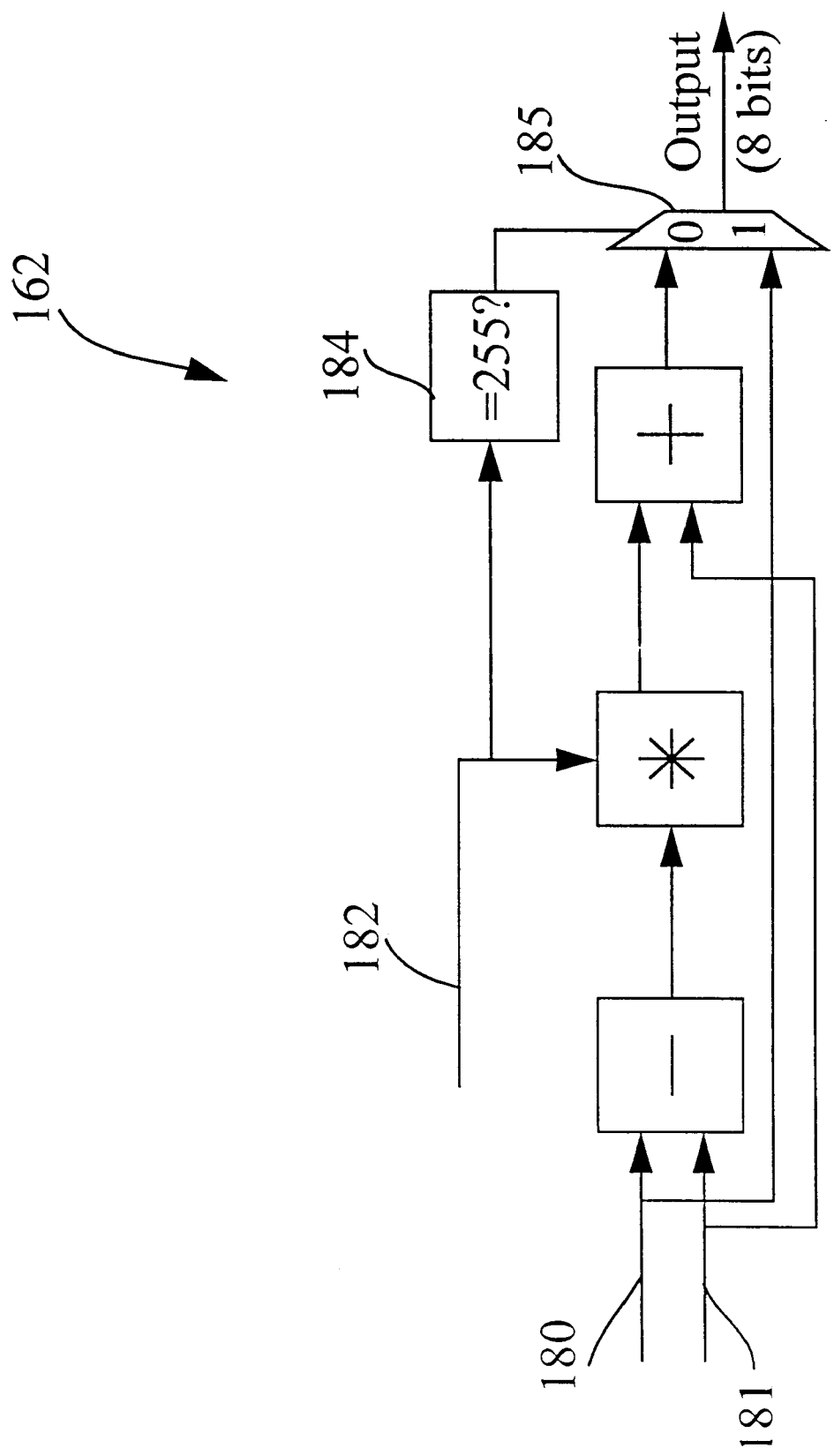
FIG. 35 is a schematic block diagram of a mixer unit of FIG. 34.

Referring now to FIG. 35, there is shown the full mixer 162 of FIG. 34 in more detail. The full mixer 162 implements Equation 19 with base color input C2(x,y) 180 and opaque color input C1(x,y) 181. The transparency amount input k(x,y) 182 determines the amount of transparency with opaque detector 184 detecting fully opaque base color data (which for 8 bit capacity data occurs when the opacity value equals 255) and outputting a signal to multiplexer 185 when fully opaque transparency information is detected. Multiplexer 185 chooses between fully opaque data and composited data and outputs the chosen color data to the simple mixer 163 (FIG. 34).

Referring again to FIG. 34, the simple mixer 163, whose structure is the same as the full mixer 162, is provided to allow a user to superimpose, onto the layout, recolored high contrast items put, by a user, on the scanning device 1. This provides a final layer that can be placed over a whole layout. The amount of transparency in this final layer is controlled by multiplexer 175 which chooses between a fully transparent input signal 188 and a transparency value determined by recolor register 171.

Finally, the output 189 from the simple mixer 163 is forwarded to the ink jet printer 4 for printing.

Referring again to FIG. 28, the compositor 98 is required to work at the output speed of the ink jet printing device and as a result, a clock resynchronization unit 137 is provided to synchronize the various control signals from the ink jet printing device with that of the band rendering subsystem. The band rendering subsystem 88 is best implemented as an Application Specific Integrated Circuit (ASIC) in CMOS device technology utilizing sub micron design rules. In such a technology, it is likely that there will be a mismatch between the clock speed of the band rendering subsystem and the ink jet printing device, unless they are both run from the same clock (which is the preferable method of operation). When the band rendering subsystem 88 runs at a higher clock speed than the ink jet printing device (which, in the case of Canon's CJ10 ink jet printer, has a clock speed of approximately 5.376 MHz) a clock resynchronization unit 137 is provided for the orderly synchronization of signals between the ink jet printer 4 and band rendering subsystem 88. The clock resynchronization unit 137 consists of a series of input and output first in first out (FIFO) queues to resynchronize input and output data and control signals.

Figure 36:
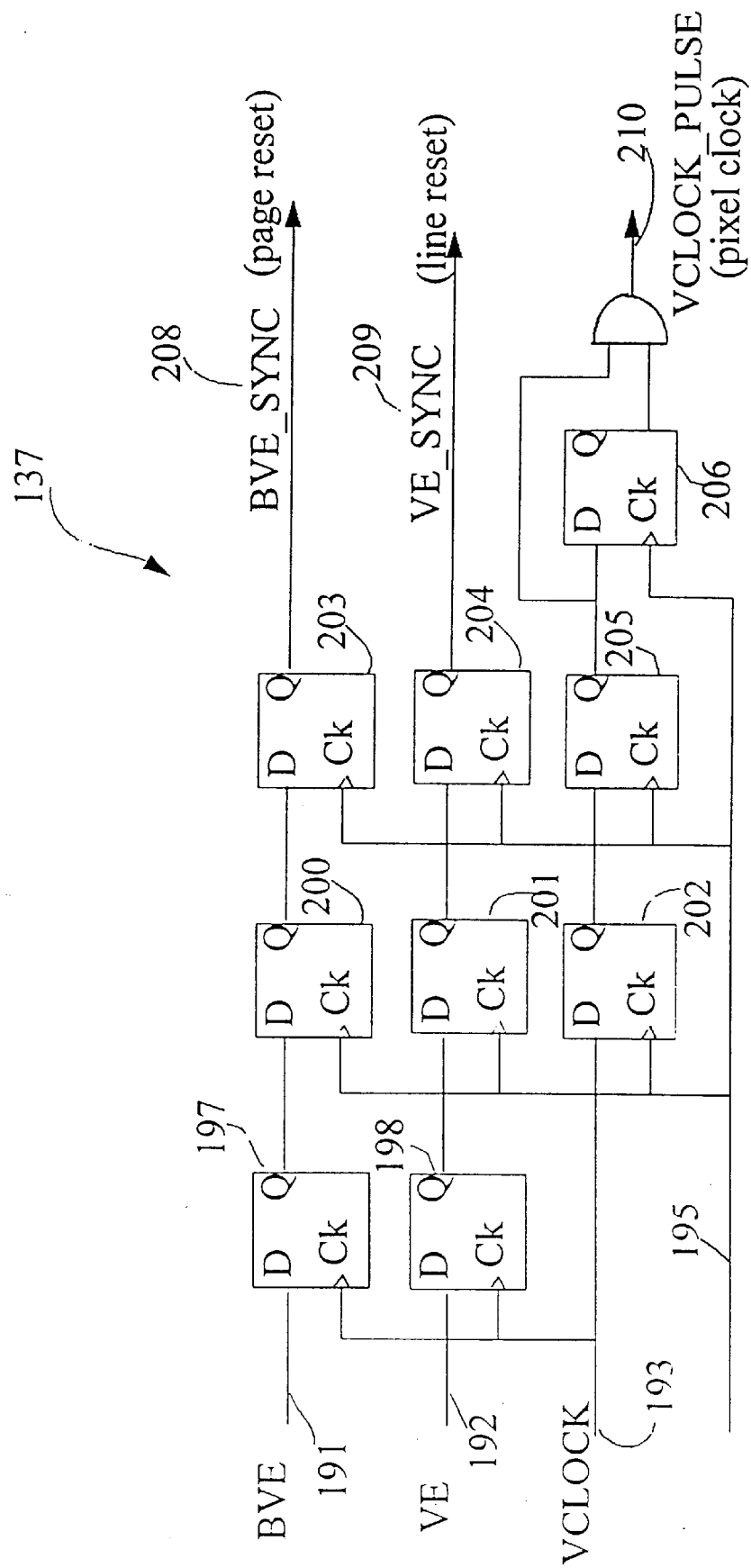
FIG. 36 is a schematic block diagram of the resynchronization unit of FIG. 28.

Referring now to FIG. 36, there is shown the resynchronization unit 137 in more detail. The resynchronization unit 137 takes a new page input signal 191, a new line input signal 192 and a pixel clock signal 193. The signals from the printer device are firstly synchronized to the printer device's pixel clock 193 by latches 197, 198 before being synchronized to the band rendering subsystem clock 195 via latches 200–206 to produce a synchronized new page signal 208, a synchronized new line signal 209 and a synchronized pixel clock signal 210.

It can be seen from the foregoing description that there is provided a efficient system for the rendering of complex computer based images and their combination with scanned data so as to create versatile and attractive art works which are particularly adapted for printing out on band based ink jet printers.

The foregoing only describes one embodiment of the present invention. Modifications, obvious to those skilled in the art, can be made thereto without departing from the scope of the invention.

What is claimed is:

1. A graphical object rendering system for the rendering of images from edge based object descriptions, into pixel based data, said system comprising:

a buffer means comprising an array of storage structures to hold pixel level date, with each pixel level data structure comprising a series of setable level indicators;

storage means for storing an edged based object description of a desired image, each edge of each object having a level value corresponding to the level of the object;

edge insertion means connected to said buffer means and said storage means, to alter said setable level indicators at locations corresponding to any intersection of said edges with said pixels;

highest object determination means to determine the object with the highest currently active level, said highest object determination means being connected to said buffer means and, for each corresponding pixel level data structure of said array of pixel level data structures, determining the object with the highest currently active level; and shadow buffer means connected to said buffer means, to said edge insertion means and to said highest object determination means, said shadow buffer including a summary of the contents of said buffer means, thereby to increase the speed of operation of said edge insertion means and said highest object determination means.

2. A system as set as claimed in claim 1, further comprising output control means connected to said storage means and said highest object determination means, said output control means outputting a corresponding pixel color of said highest currently active level object for each of said corresponding pixels.

3. A system as claimed in claim 2, wherein said highest object determination means includes run-length encoding means for converting said highest currently active object level for said pixels into corresponding run-length encoded data.

4. A system as claimed in claim 2, further comprising compositor means for combining scanned image data with said pixel color of said highest currently active level object for each of said corresponding pixels.

5. A system as claimed in claim 4, further comprising attribute detection means connected to said compositor means and capable of detecting and altering predetermined attributes of said scanned image data.

6. A system as claimed in claim 4, wherein said compositor means includes transparency determination means for combining a portion of said scanned image with a portion of said color of said corresponding pixel to form an output pixel color.

7. A system as claimed in claim 2, wherein said output control means further comprises a blend calculator to create a predetermined blend from said object description of said highest currently active object.

8. A system as claimed in claim 7, wherein said object description contains a blend description component which comprises data for defining a plane in a three dimensional space with two axes defining a location for each pixel and the third axis defining a color value for each pixel.

9. A system as claimed in claim 1, wherein said image is constructed from a plurality of bands, each said band comprising a plurality of lines, each said line comprising a plurality of pixels, and said buffer means comprises an array of pixel levels corresponding to one line of one band of said image.

10. A system as claimed in claim 9, further comprising:
band clipping means adapted to determine which objects are active in a current band.

11. A system as claimed in claim 10, wherein said band clipping means further clips those objects active in a current band to the edges of the current band.

12. A system as claimed in claim 9, further comprising object band intersection formation means connected to said storage means and adapted to create a list of objects active in said image, said list sorted by initial activation of an object within a band.

13. A system as claimed in claim 12, wherein said list further comprises band termination information indicating in which band each object ceases to be active.

14. A system as claimed in claim 9, wherein said edges initially comprise spline based data, said system further comprising:
a spline vectorization means connected to said storage means and adapted to convert said spline based data to corresponding line segment data.

15. A system as claimed in claim 14, further comprising:
vector line intersection formation means connected to said storage means and adapted, for each band of said image, to create a list of active line segments within said band.

16. A system as claimed in claim 15, wherein said list is sorted by initial activation of said line segments within a band.

17. A system as claimed in claim 9, wherein said highest object determination means further includes paper slippage means for determining pixels at the edges of said bands which are not required to be determined.

18. A system as claimed in claim 1, wherein said image is to be rendered on a page and said system further comprises:
page clipping means connected to said storage means and adapted to clip said edge based object description to the boundaries of the page to be rendered.

19. A system as claimed in claim 18, wherein said edge based object description includes spline outline information, and said page clipping means clips said edge based object description by replacing the spline outline information of those objects lying partially off the page with straight line spline segments which correspond to the edges of the page.

20. A system as claimed in claim 1, wherein each of said objects includes optional associated level transparency information and said highest object determination means additionally determines the highest active object with associated level transparency information.

21. A system as claimed in claim 1, wherein said highest object determination means includes a toggle latch for each of said series of setable level indicators of a pixel level data structure, and said highest object determination means reads said buffer in a predetermined order and toggles said toggle latch each time a corresponding setable level indicator of said toggle latch has been altered by said edge insertion means.

22. A system as claimed in claim 1, further comprising data structure initiation means connected to said storage means and adapted to perform manipulation of said object description from a first set of predetermined co-ordinates to a set of page co-ordinates of said pixel based data, said manipulation being selected from the group consisting of translation, rotation and skewing.

23. A system as claimed in claim 1, further comprising shadow buffer means connected to said buffer means, said edge insertion means and said highest object determination means, said shadow buffer including a summary of the contents of said buffer means to thereby increase the speed of operation of said edge insertion means and said highest object determination means.

24. A method of rendering an image from an object based description of said image to a description comprising a plurality of lines with each line made up of a plurality of pixels, each of said objects having an associated level, said method comprising the steps of:
determining objects active on a current portion of a line of said image,
determining the edges of said currently active objects,
storing the edge locations of the intersection of the edges of said currently active objects with said current portion of a line in a first buffer at corresponding pixel positions,
storing a summary of the contents of said first buffer in a second buffer,
reading said second buffer to determine a memory state,
depending on said memory state, reading said first buffer in a pixel position by pixel position order, and
determining the currently active highest edge from a reading of at least one of said buffers.

25. A graphical object rendering system for the rendering of images from edge based object descriptions, into pixel based data, said system comprising:
a buffer means comprising an array of storage structures to hold pixel level data, where each pixel level data structure comprises a series of setable level indicators;
storage means for storing an edged based object description of a desired image, each edge of each object having a level value corresponding to the level of the object;
edge insertion means, connected to said buffer means and said storage means, for altering said setable level indicators at locations corresponding to any intersection of said edges with said pixels;
highest object determination means for determining the object with the highest currently active level, said highest object determination means being connected to said buffer means and, for each corresponding pixel level data structure of said array of pixel level data structures, determining the object with the highest currently active level;
shadow buffer means connected to said buffer means, said edge insertion means and said highest object determination means, said shadow buffer including a summary of the contents of said buffer means, thereby to increase the speed of operation of said edge insertion means and said highest object determination means;
output control means, connected to said storage means and said highest object determination means, for outputting a corresponding pixel color of said highest currently active level object for each of said corresponding pixels; and
object band intersection formation means, connected to said storage means, for creating a list of objects active in said image, the list sorted by initial activation of an object within a band.

* * * * *

UNITED STATES PATENT AND TRADEMARK OFFICE
CERTIFICATE OF CORRECTION

PATENT NO. : 5,912,672

DATED : June 15, 1999

INVENTOR(S) : VINCENZO LIGUORI

It is certified that error appears in the above-identified patent and that said Letters Patent is hereby corrected as shown below:

ON THE TITLE PAGE

[54] IN THE TITLE:
"SETABLE" should read --SETTABLE--.

[57] IN THE ABSTRACT:
Line 6, "setable" should read --settable--; and
Line 11, "setable" should read --settable--.

IN THE DRAWINGS

SHEET 14 OF 32
Fig. 17, "Compositer" should read --Compositor--.
SHEET 25 OF 32
Fig. 28, "Compositer" should read --Compositor--.

COLUMN 1

Line 4, "SETABLE" should read --SETTABLE--; and
Line 57, "setable" should read --settable--.

COLUMN 2

Line 10, "having" should read --has--; and
Line 11, "including" should read --includes--.

COLUMN 6

Line 11, "has" should read --have--; and
Line 13, "objects" should read --object--.

UNITED STATES PATENT AND TRADEMARK OFFICE
CERTIFICATE OF CORRECTION

PATENT NO.   : 5,912,672

DATED        : June 15, 1999

INVENTOR(S)  : VINCENZO LIGUORI

It is certified that error appears in the above-identified patent and that said Letters Patent is hereby corrected as shown below:

COLUMN 8

Line 29, "62" should read --at step 62--; and
    Line 30, "at step" should be deleted.

COLUMN 12

Line 31, "b 128bits" should read --128 bits--.

COLUMN 14

Line 24, "and" should be deleted.

COLUMN 17

Line 12, "define" should read --defining--; and
    Line 50, "As for" should read --For--.

COLUMN 18

Line 43, "and" should read --an--; and
    Line 58, "c1(x,y)" should read --$C_1(x,y)$--.

COLUMN 19

Line 6, "c2(x,y)" should read --$C_2(x,y)$--;
    Line 7, "c1(x,y)" should read --$C_1(x,y)$--; and
    Line 59, "a" should read --an--.

UNITED STATES PATENT AND TRADEMARK OFFICE
CERTIFICATE OF CORRECTION

PATENT NO. : 5,912,672

DATED : June 15, 1999

INVENTOR(S) : VINCENZO LIGUORI

It is certified that error appears in the above-identified patent and that said Letters Patent is hereby corrected as shown below:

COLUMN 20

Line 6, "date" should read --data--;
Line 7, "setable" should read --settable--; and
Line 12, "setable" should read --settable--.

COLUMN 21

Line 51, "setable" should read --settable--; and
Line 54, "setable" should read --settable--.

COLUMN 22

Line 32, "setable" should read --settable--; and
Line 38, "setable" should read --settable--.

Signed and Sealed this

Sixth Day of June, 2000

Attest:

Q. TODD DICKINSON

*Attesting Officer*     *Director of Patents and Trademarks*